US009511420B2

(12) United States Patent
Parker et al.

(10) Patent No.: US 9,511,420 B2
(45) Date of Patent: Dec. 6, 2016

(54) SELF-PROPELLED ROTARY TOOL

(76) Inventors: Grant Leonard Parker, Vienna (CA);
Hossam El Deen Ahmed Kishawy,
Whitby (CA)

(*) Notice: Subject to any disclaimer, the term of this patent is extended or adjusted under 35 U.S.C. 154(b) by 204 days.

(21) Appl. No.: 14/124,469

(22) PCT Filed: Jun. 6, 2012

(86) PCT No.: PCT/CA2012/000552
§ 371 (c)(1),
(2), (4) Date: Feb. 21, 2014

(87) PCT Pub. No.: WO2012/167360
PCT Pub. Date: Dec. 13, 2012

(65) Prior Publication Data
US 2014/0186127 A1    Jul. 3, 2014

Related U.S. Application Data

(60) Provisional application No. 61/494,210, filed on Jun. 7, 2011.

(51) Int. Cl.
*B23B 5/00* (2006.01)
*B23B 27/08* (2006.01)
*B23B 29/12* (2006.01)
*B23B 1/00* (2006.01)

(52) U.S. Cl.
CPC .............. *B23B 27/08* (2013.01); *B23B 29/12* (2013.01); *B23B 2200/0461* (2013.01); *B23B 2250/125* (2013.01); *Y10T 407/12* (2015.01)

(58) Field of Classification Search
CPC .......... B23B 5/2208; B23B 5/22; B23B 5/223; B23B 5/224
See application file for complete search history.

(56) References Cited

U.S. PATENT DOCUMENTS 2,230,455 A * 2/1941 Githens ................... B23B 27/12
407/1
2,233,724 A * 3/1941 Bannister ............... B23B 27/12
407/103
RE26,637 E * 7/1969 Vaughn ................ B23C 5/2208
15/93.1

(Continued)

OTHER PUBLICATIONS

International Search Report and Written Opinion for PCT/CA2012/000552 dated Oct. 17, 2012.

*Primary Examiner* — Will Fridie, Jr.
(74) *Attorney, Agent, or Firm* — Norton Rose Fulbright Canada LLP

(57) ABSTRACT

The present invention is a rotary head tool that is a self-propelled rotary tool (SPRT) operable for round cutting involving hard turning. The rotary head tool comprises generally a toolholder, a tool that is removably or fixedly connectable to the toolholder, and an insert that that incorporates a cutting edge finable into the tool. The toolholder is formed to hold the tool with the insert therein at a particular angle. Elements of the rotary head tool of the present invention, such as the insert, may be "off the shelf elements and consequently the present invention may be produced at a low cost. Embodiments of the present invention are designed so that the rotary head tool provides economical benefits and affordability for the user and to provide performance benefits of SPRTs.

6 Claims, 16 Drawing Sheets

(56) References Cited

U.S. PATENT DOCUMENTS

| | | | |
|---|---|---|---|
| 3,486,542 A * | 12/1969 | Blackwell, Jr. | E01B 31/22 144/133.1 |
| 4,051,584 A | 10/1977 | Huser | |
| 4,191,075 A * | 3/1980 | Morgunsky | B23B 27/12 407/11 |
| 4,477,211 A * | 10/1984 | Briese | B23B 27/12 407/7 |
| 5,207,724 A | 5/1993 | Shouse | |
| 5,505,568 A * | 4/1996 | Takama | B23B 27/12 407/64 |
| 5,809,854 A | 9/1998 | Thielen | |

\* cited by examiner

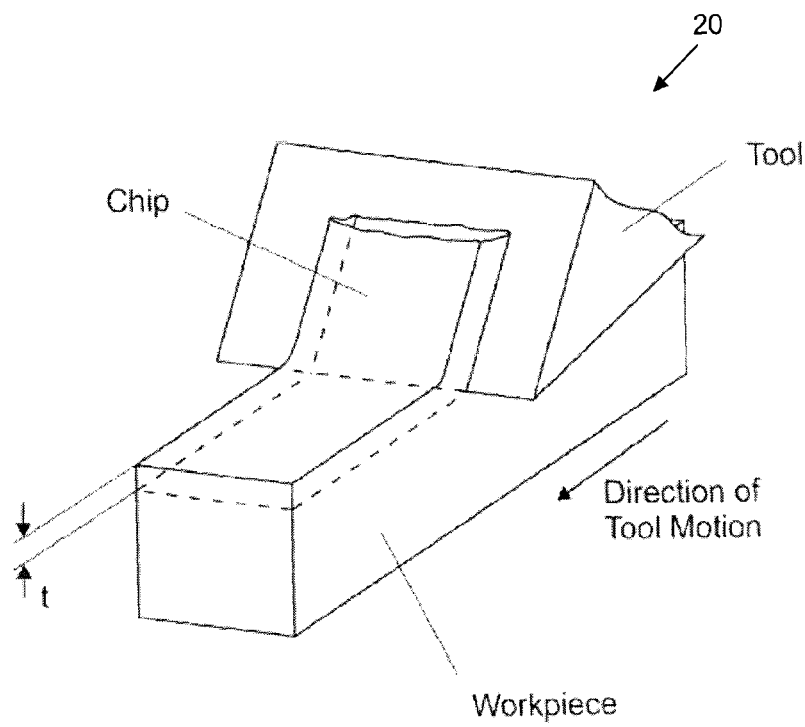
PRIOR ART
FIG. 1
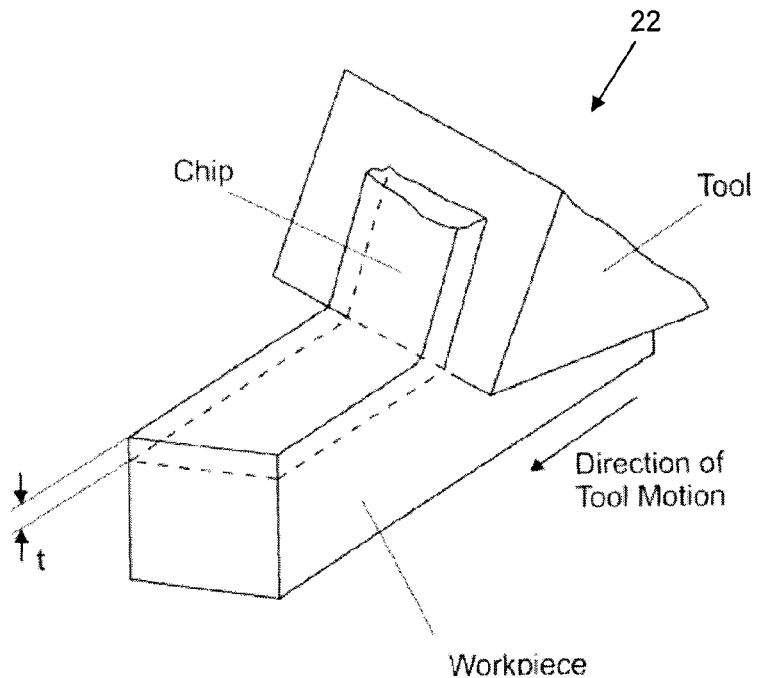
PRIOR ART
FIG. 2

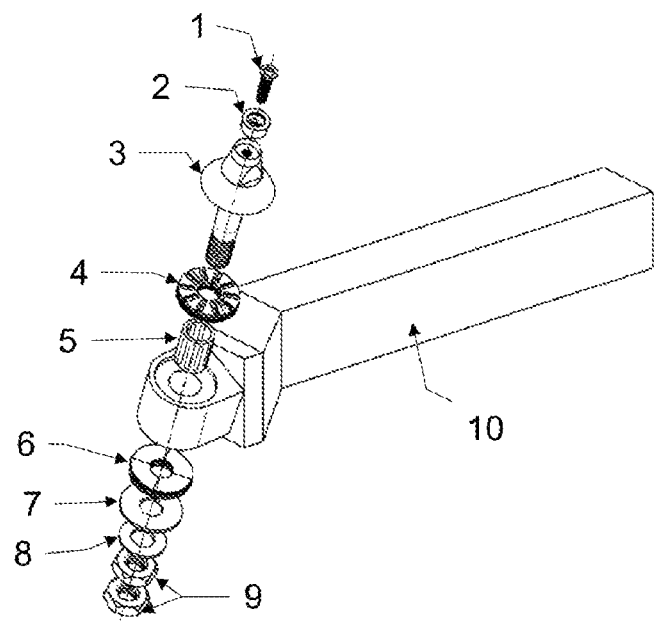
FIG. 3
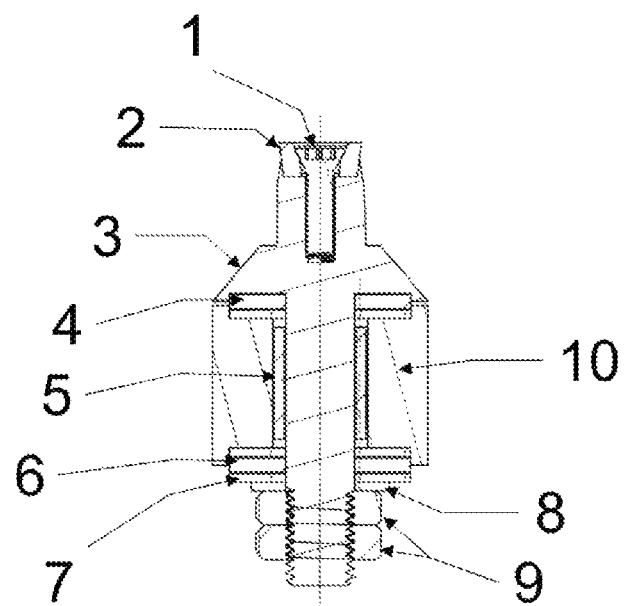
FIG. 4

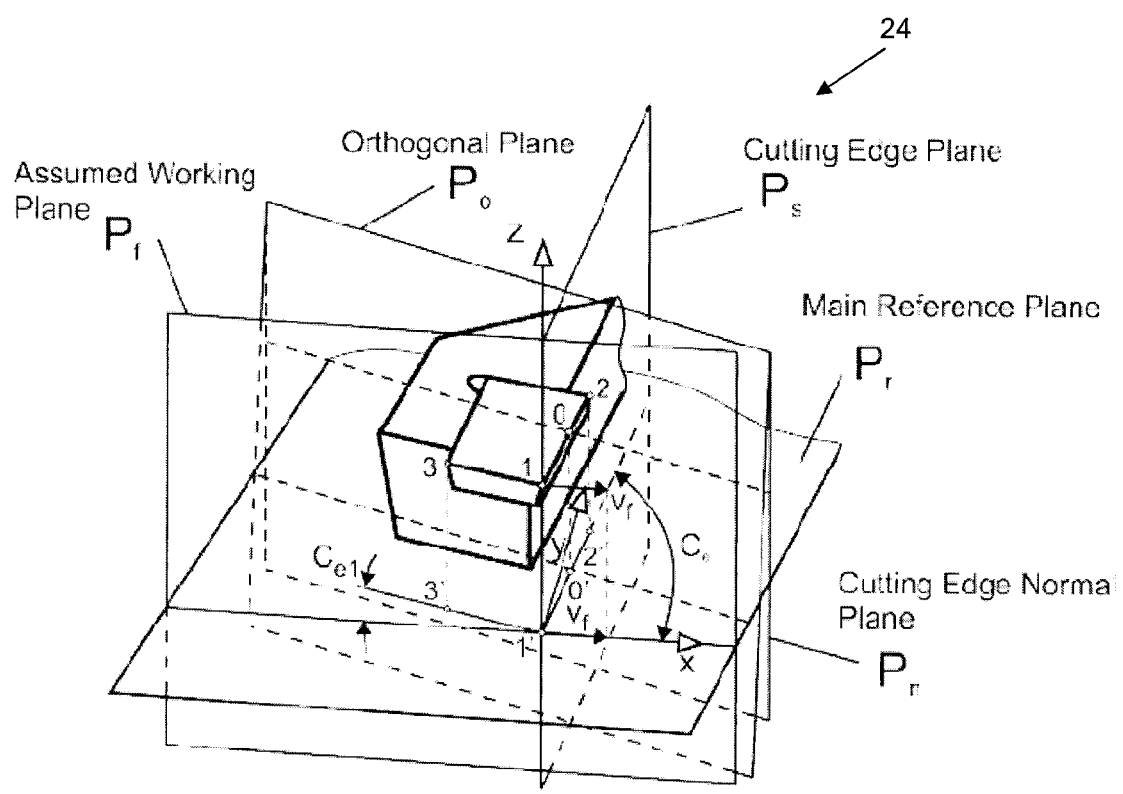
PRIOR ART
FIG. 5

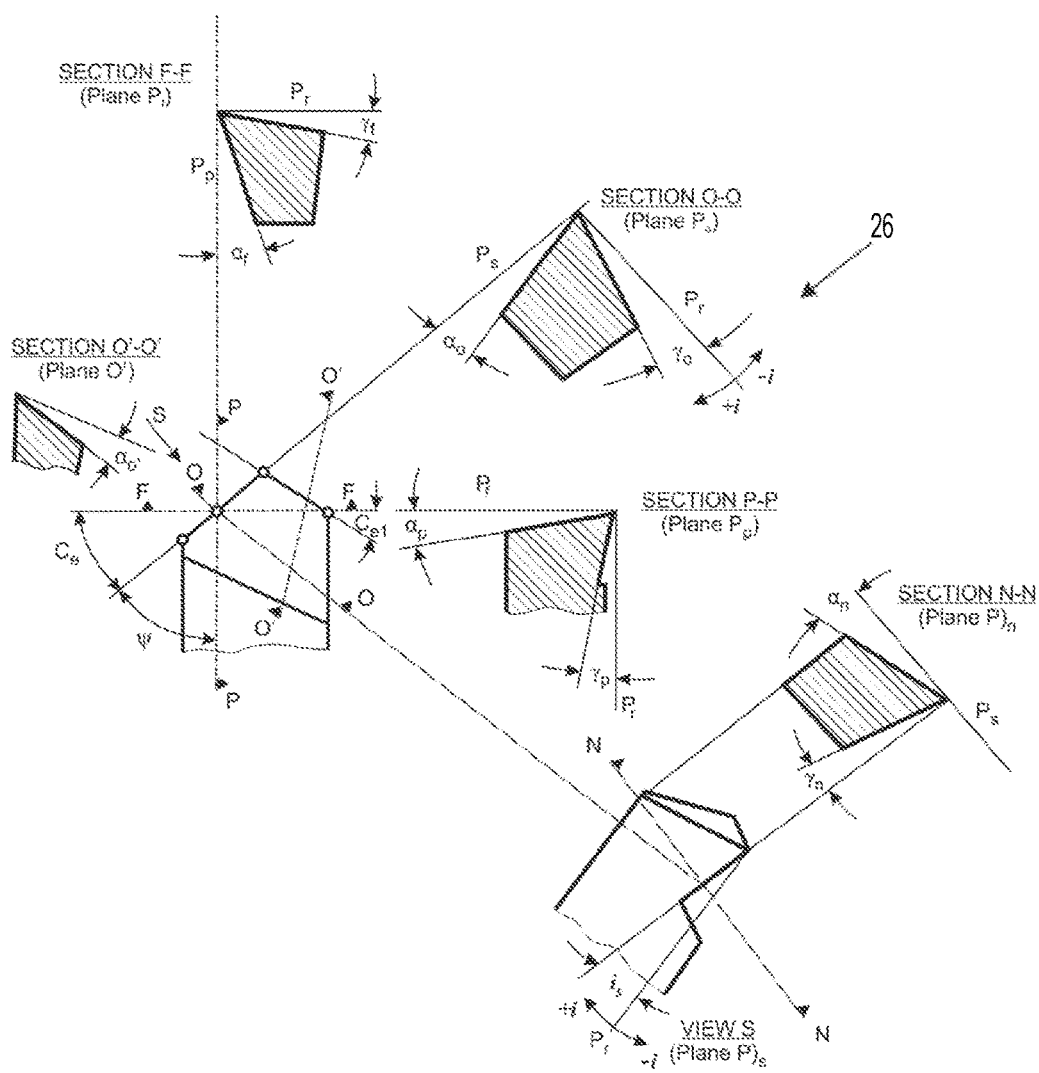
FIG. 6
PRIOR ART

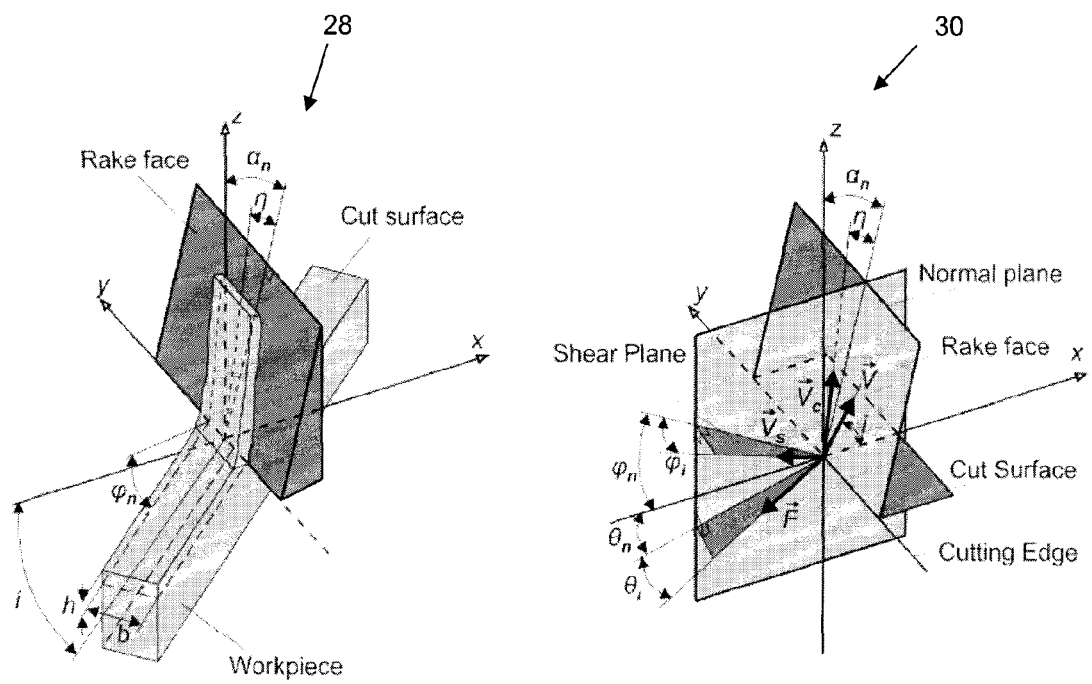
PRIOR ART
FIG. 7a
PRIOR ART
FIG. 7b

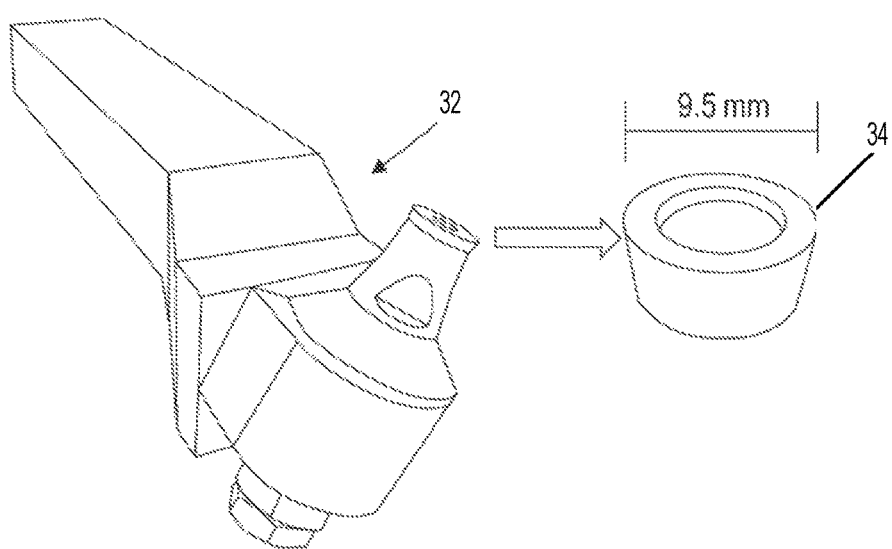
FIG. 8

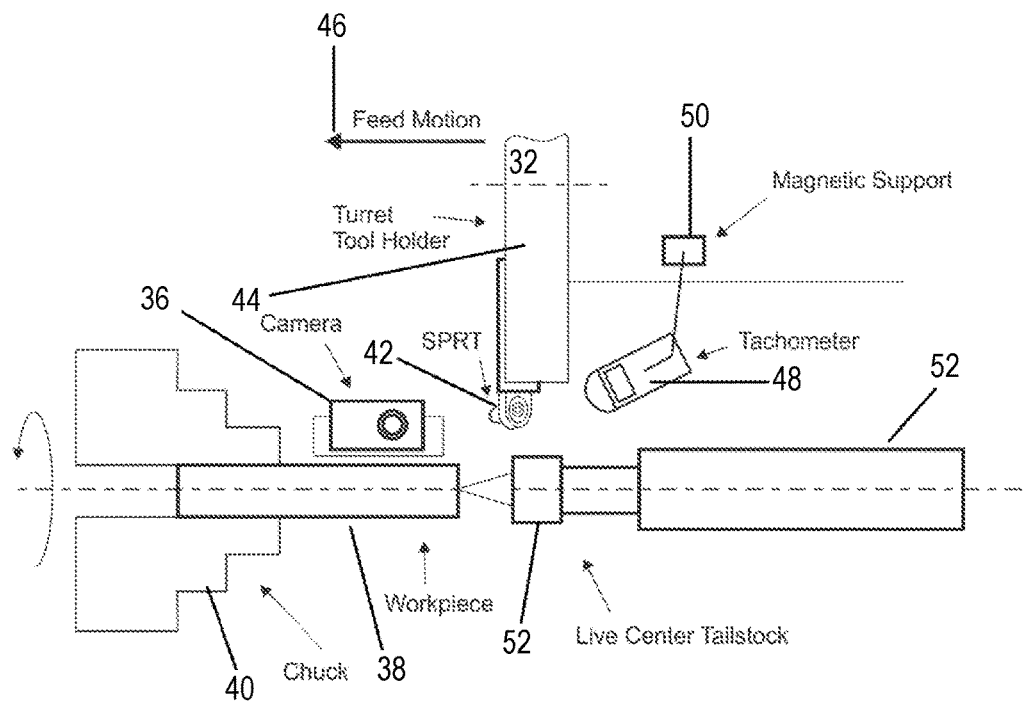
FIG. 9

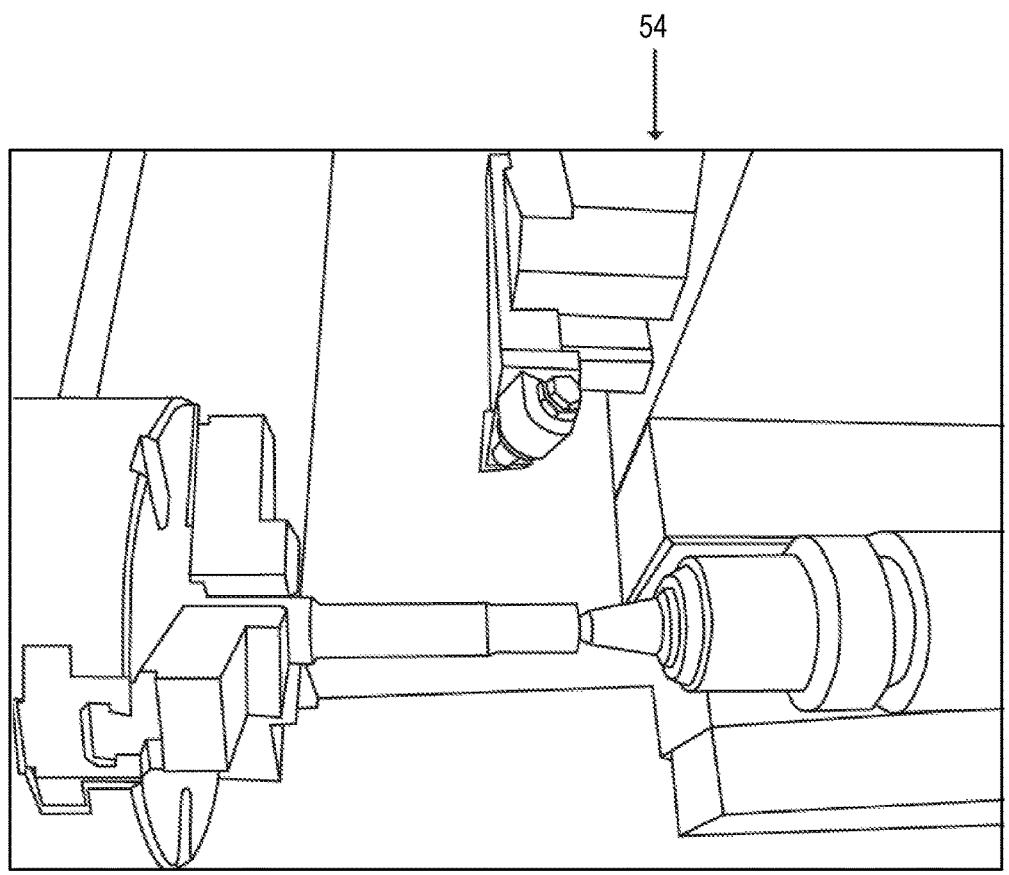
FIG. 10

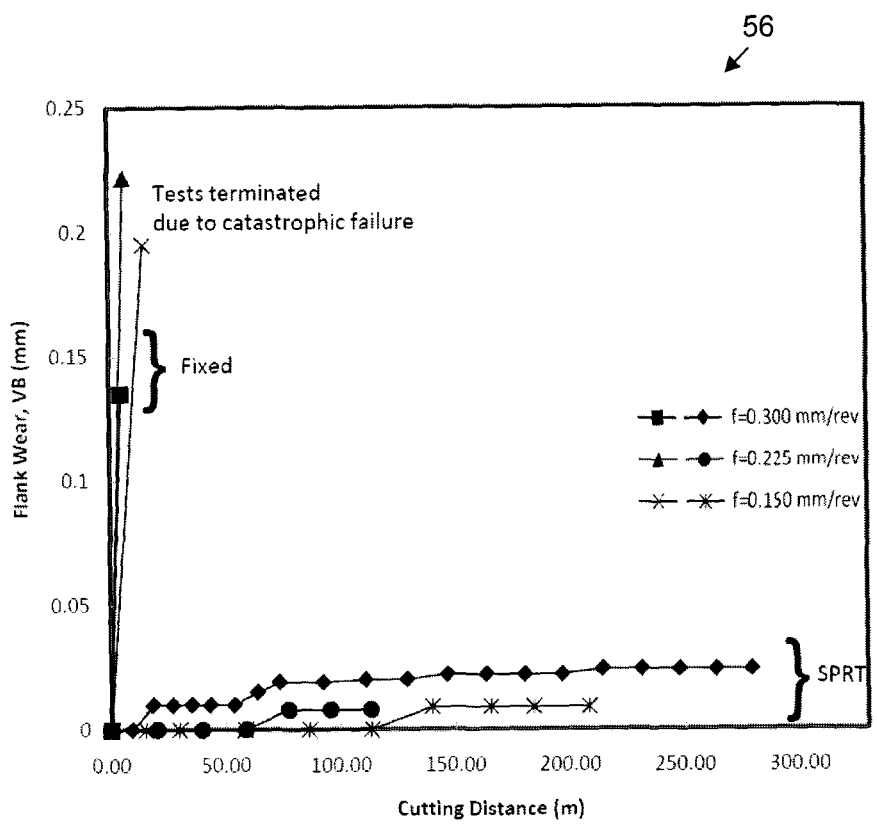
FIG. 11
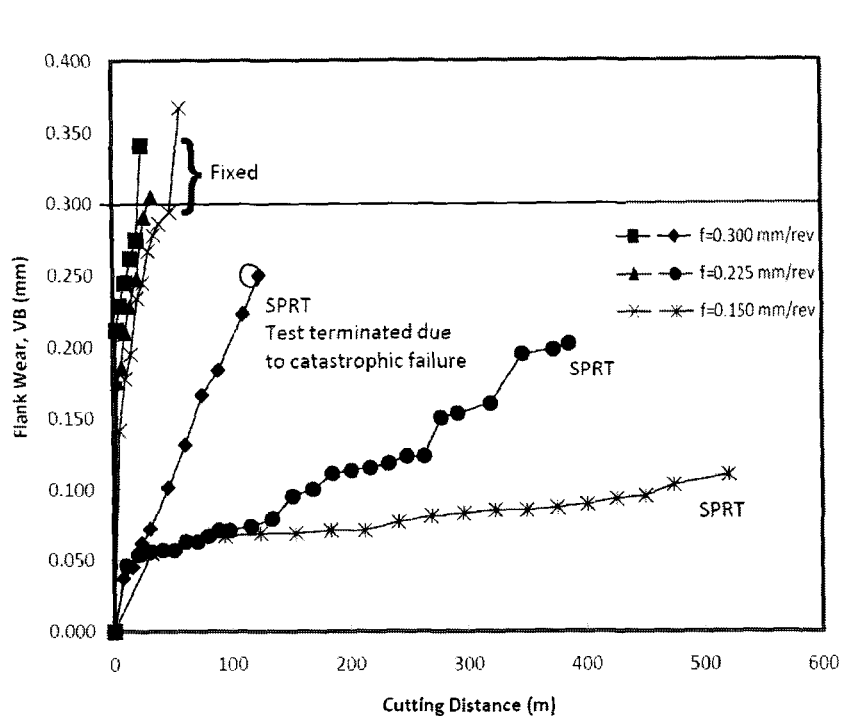
FIG. 12

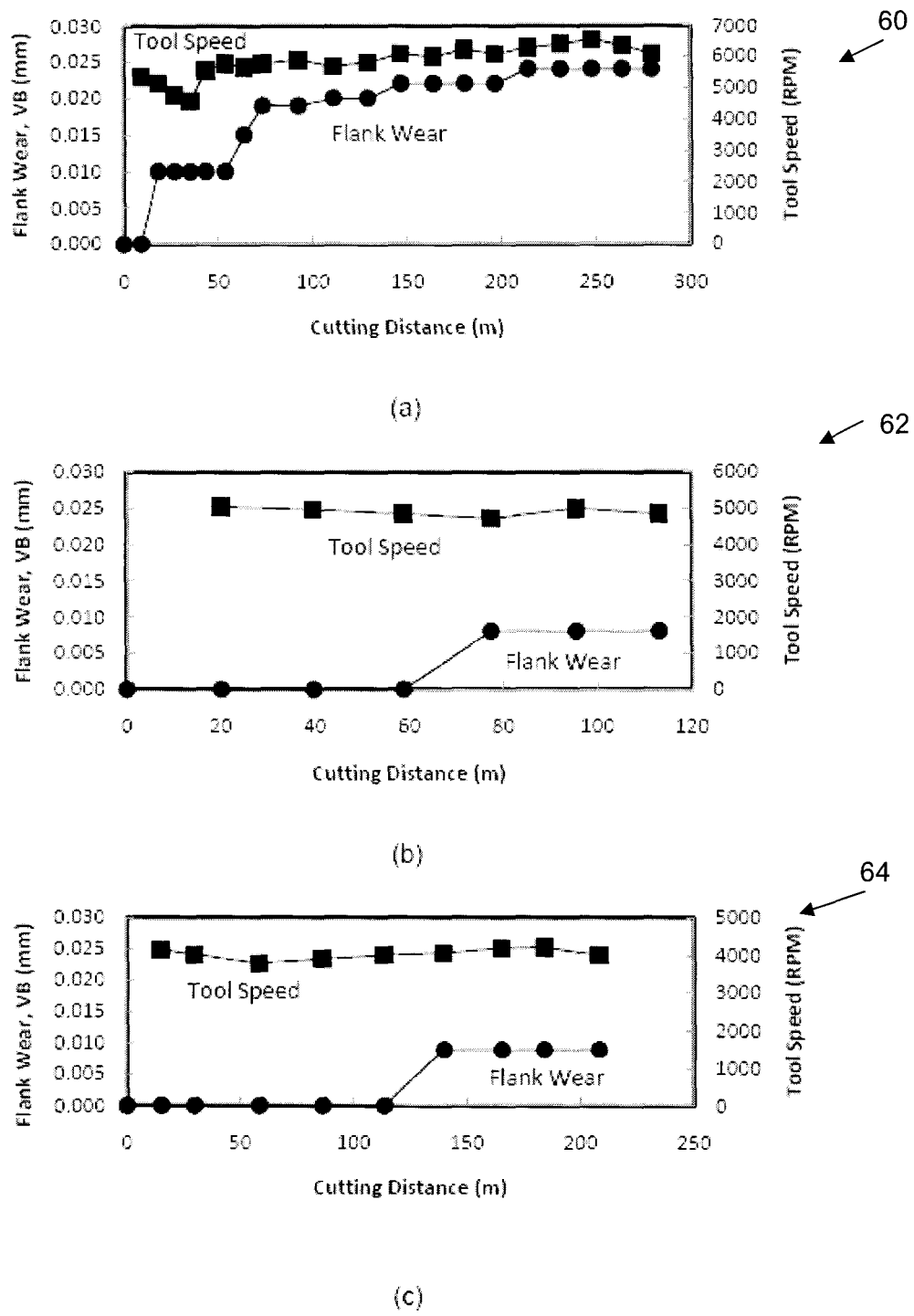
FIG. 13

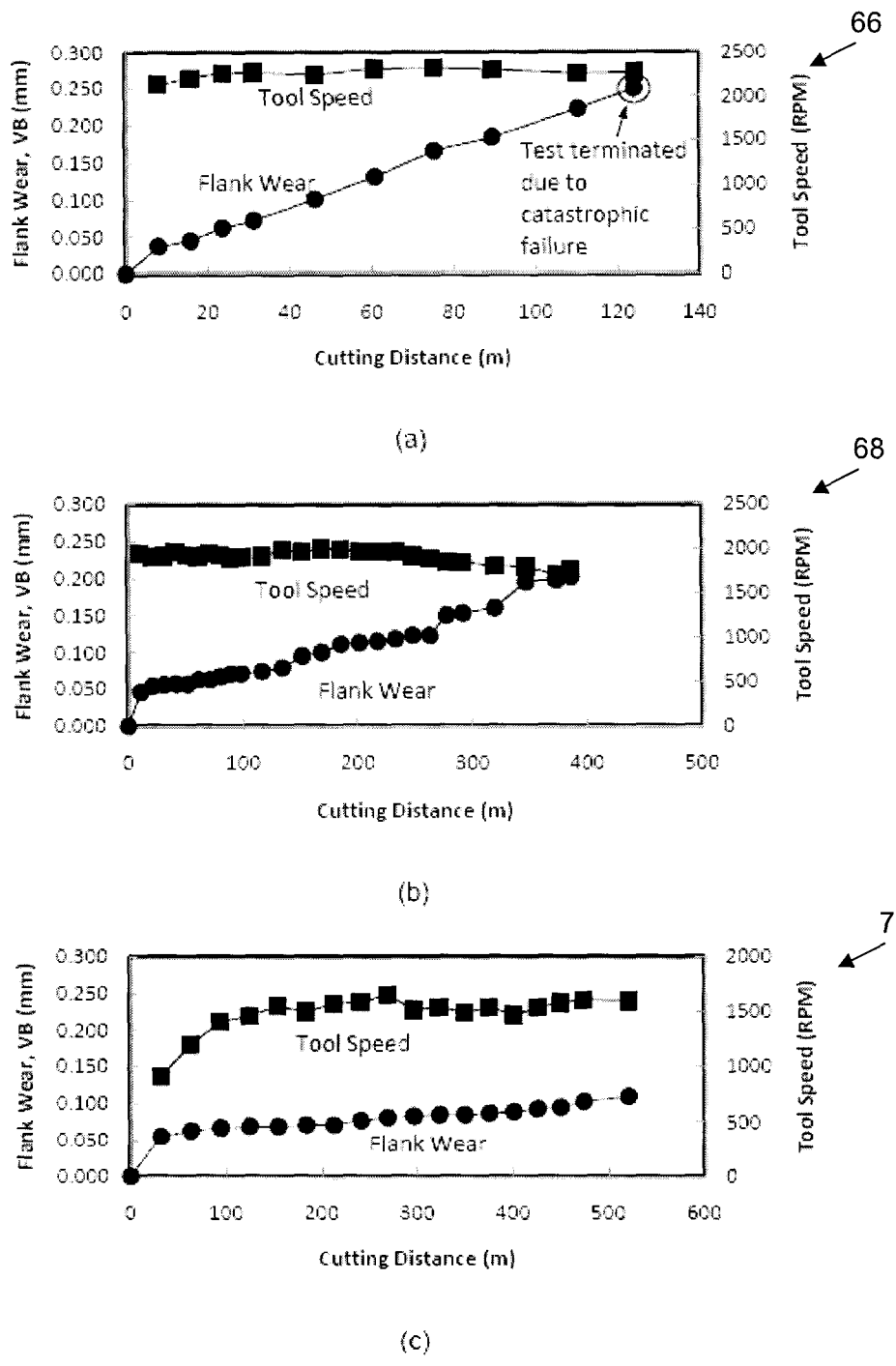
FIG. 14

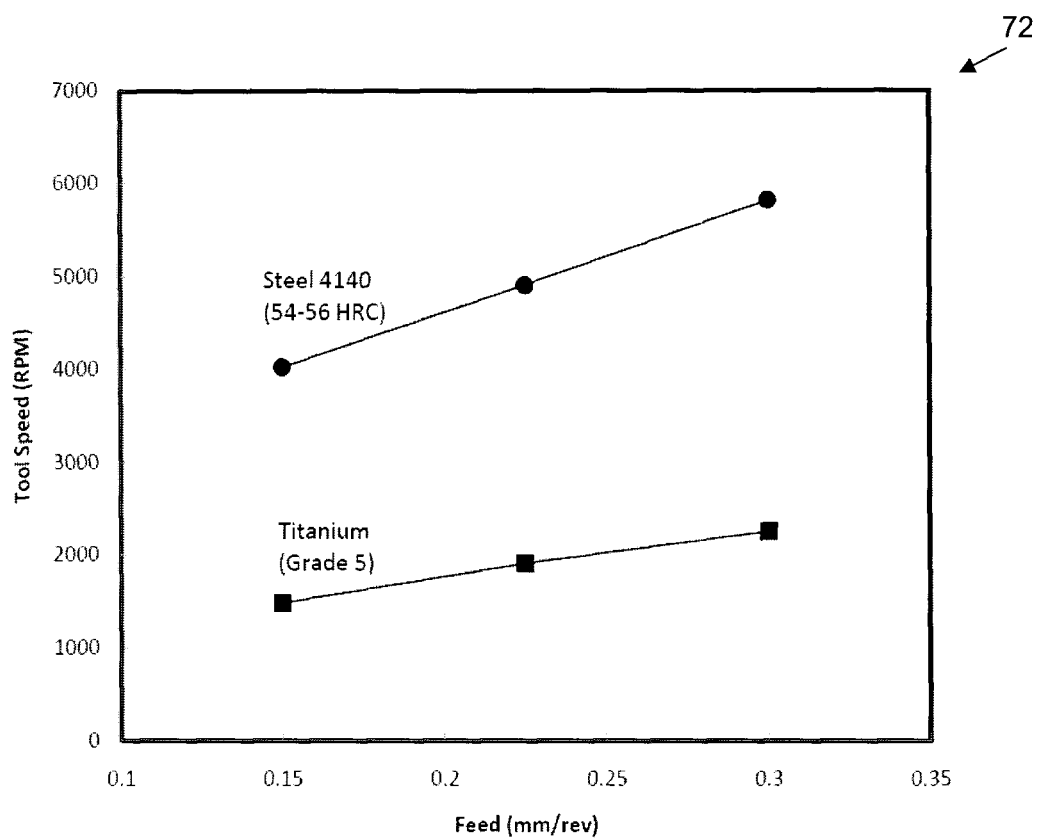
FIG. 15

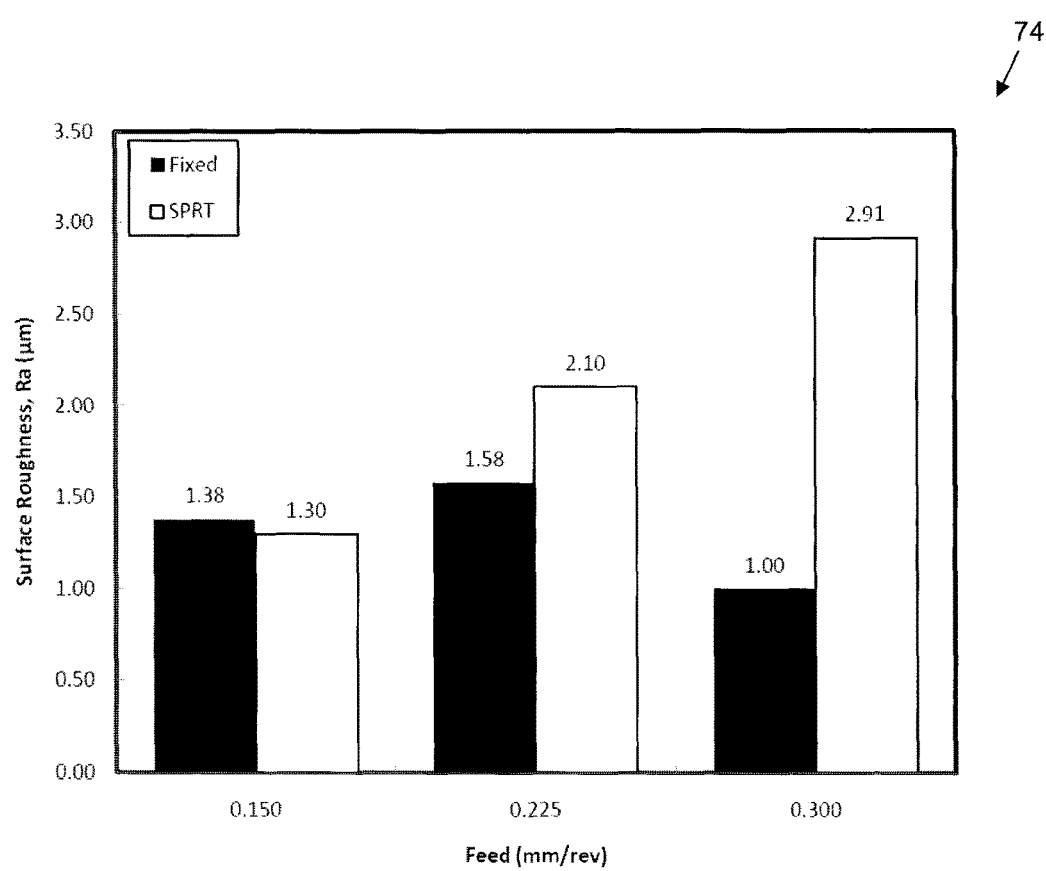
FIG. 16

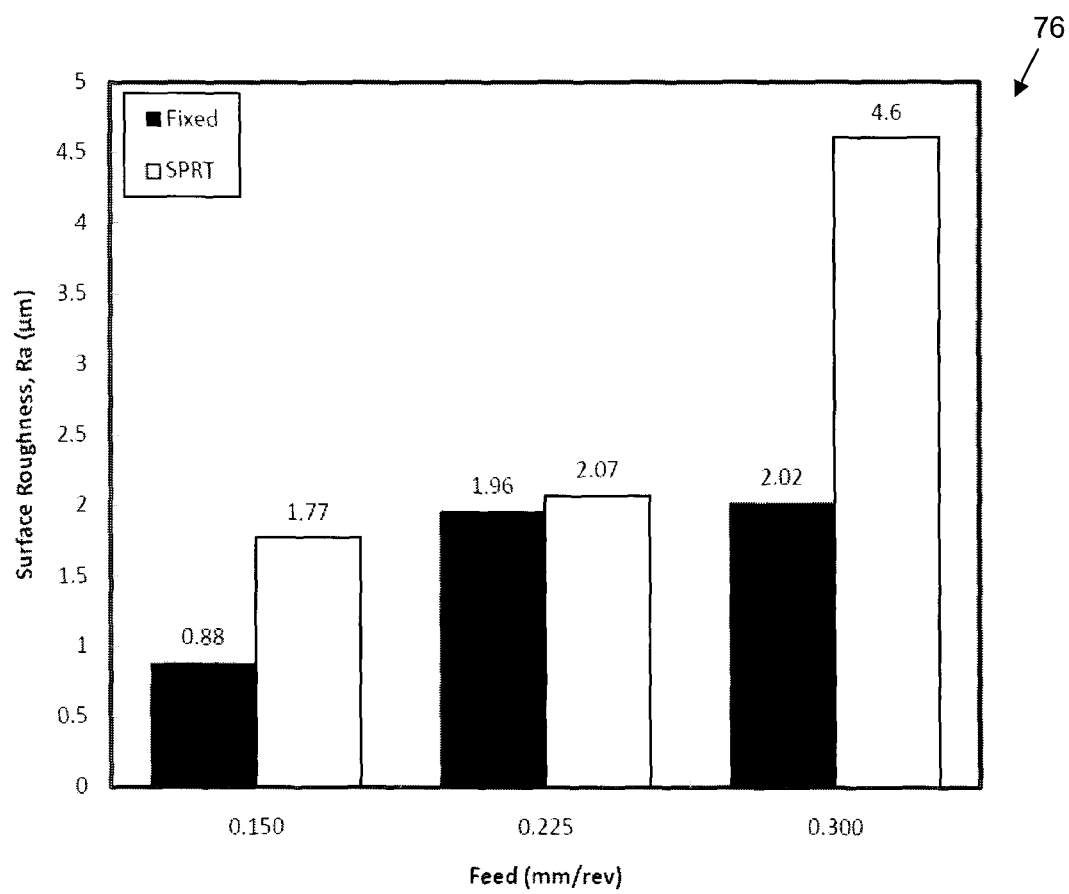
FIG. 17

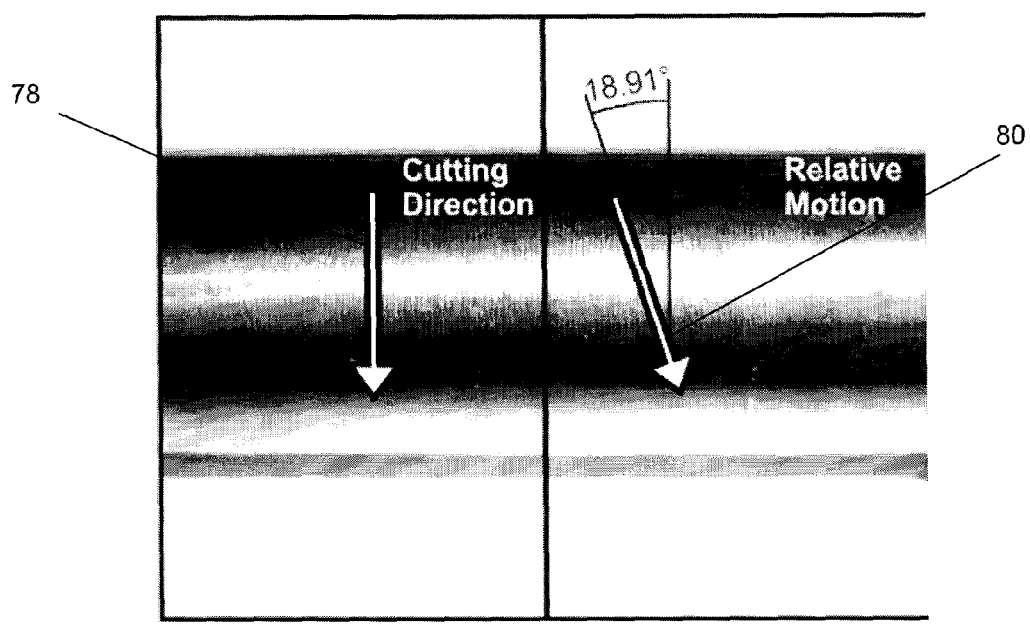
FIG. 18

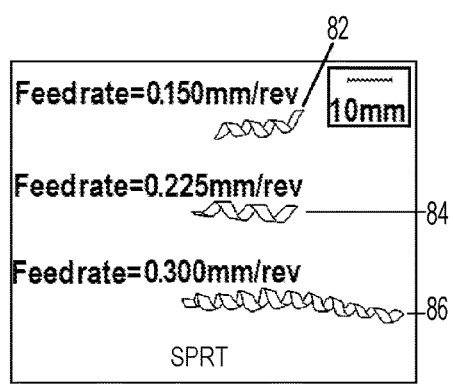
FIG. 19a
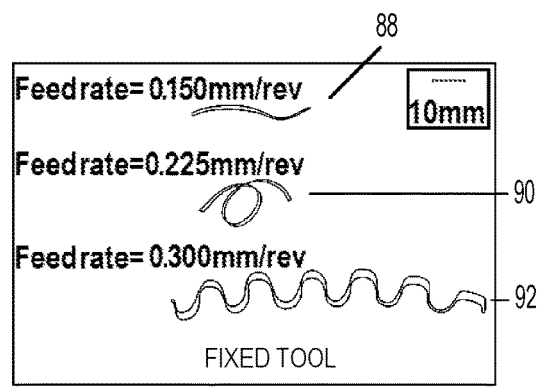
FIG. 19b
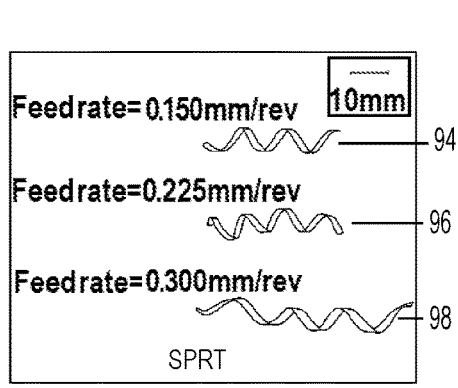
FIG. 20a
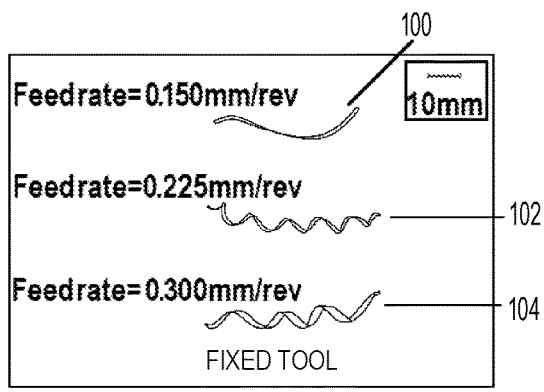
FIG. 20b

SELF-PROPELLED ROTARY TOOL

FIELD OF INVENTION

This invention relates in general to the field of self-propelled rotary cutting tools and more particularly to self-propelled rotary cutting tools for hard cutting configured to incorporate off-the-shelf components.

BACKGROUND OF THE INVENTION

More than two-thirds of all the superalloys produced are consumed by the aerospace and automotive industries. The remaining portion of superalloy consumption is used by the chemical, medical, and structural industries in applications requiring high temperature properties and/or exceptional corrosion resistance. The ability to retain high mechanical and chemical properties at elevated temperatures make superalloys ideal for use in both rotating and stationary components in the IC engine of an automobile or in the hot end of a jet engine. These materials as well as structural ceramics and hardened steels pose formidable challenges for cutting tool materials during machining; hence they are referred to as difficult-to-cut.

Conventionally in the machining industry, generating a component from raw goods includes a casting or forging process, rough machining, heat treatment to a desired hardness, and then finished-machining through a grinding process. Grinding has several disadvantages, which include high specific energy consumption and low material removal rates.

Hard turning is a machining process whereby "hard" workpieces, for example, such as steel, are shaped by moving a cutting tool against the workpiece. The cutting tool may be stationary or rotary. High cutting temperatures are generated during hard turning. The generated temperatures cause thermal softening of the workpiece material in the cutting zone leading to reduced cutting forces. The reduction of generated force is desirable. However, excessive temperatures generate thermal damage on the machined surface as well as soften the cutting edge leading to plastic deformation. The high specific forces and temperatures affect the modes of tool wear in hard turning. The generated tool wear affects the integrity of the generated surface and therefore controlling it is a major challenge. The adverse effect of heat on the tool tip can be reduced by using cutting fluid or by continuously supplying a fresh cutting edge, as is the case in rotary cutting tools.

Rotary tool cutting involves a tool in the form of a disk that rotates about its axis. Different types of rotary tools have been developed, all with similar functional characteristics, however few are commercially available. Rotary tools can be classified as either driven or self-propelled. The former is provided rotational motion by an external source while the latter is rotated by the chip flow over the rake face of the tool.

Rotary cutters are known to reduce the heat generated during turning operations and can result in the rotary cutter itself enjoying a longer life span compared to non-rotating cutters. Non-rotating cutters induce higher cutting forces, and generate higher heat. Coolants can be used with non-rotating cutters to combat the heat, but such coolants are generally environmentally hazardous.

In prior art rotary cutters, the inserts, which may be mounted at the tip of the tool holders, may be externally driven or self-propelled. Self-propelled cutters include a cutting insert that is rotated by the rotating work piece. As self-propelled rotary cutting tools do not require an external energy source to be rotated, the result is that self-propelled rotary cutting tools have reduced energy consumption during metal processing operations as compared to externally driven rotary cutting tools. There are few prior art self-propelled rotary tools that are commercially available.

Typically, cutting tool material hardness of at least three times harder than the work material is recommended. Cutting materials such as ceramic and polycrystalline cubic boron nitride (PCBN) are recommended for turning hardened steel because of their ability to sustain the high temperature generated during the metal removal process. Hard turning with ceramic cutting tools has been a time proven manufacturing process that may replace some grinding applications.

The basic difference between rotary cutting and conventional cutting is the movement of the cutting edge in addition to the main cutting and feed motions. Self-propelled rotary tools (SPRT) employ round inserts that rotate continuously about their central axis as a result of the driving motion impacted by the cutting force, thus minimizing the effect of thermal energy along the entire edge and preventing excessive heating of a particular portion of the cutting insert. Major benefits provided by rotary cutting tools include several hundred-fold increase in tool life, lower cutting temperatures, higher metal removal rates, generation of fine surface finishes due to the circular cutting edge, and improved machinability of difficult-to-cut materials such as nickel and titanium based alloys. Extremely low rate of flank wear can be obtained when machining superalloys, especially titanium alloys, even at higher speed conditions with negligible or no effect on the machined surfaces.

Machinists generally have interest in utilizing self-propelled rotary tools ("SPRTs") due to the economical benefits of machining with SPRTs. However, prior art SPRTs for hard-turning are not widely utilized by machinists in smaller machining facilities due to the high costs required to purchase such SPRTs and to utilize such tools. Two leading manufacturers of rotary tools, namely Rotary Technologies™ and Mitsubishi™, require specifically designed components and inserts for their production of prior art SPRTs for hard turning applications.

Machining by turning basically generates cylindrical forms with a single point tool. The cutting tool remains stationary while the workpiece rotates. This process is one of the most straightforward metal cutting methods with relatively uncomplicated definitions. However, being one of the most widely used machining methods, turning has become a highly optimized process. To maintain high efficiency requires the thorough appraisal of the various factors involved in applications.

Orthogonal and oblique cutting are the two most fundamental and conventional prior art machining types. The straight cutting edge on the tool used in orthogonal cutting 20 is positioned normal to the cutting velocity direction, as shown in FIG. 1. The depth of cut that the cutting edge engages into the workpiece is referred to as the chip thickness 't'.

Conventional oblique cutting is similar to conventional orthogonal cutting with the exception of the straight cutting edge on the tool used in oblique cutting 22 being inclined with an acute angle from the cutting velocity direction, as shown in FIG. 2. This acute angle is referred to as the inclination angle, V' and similar to conventional orthogonal cutting, the tool cutting edge is engaged into the workpiece at a depth of cut 't'. Conventional oblique cutting and orthogonal cutting are disclosed in M. C. Shaw, P. A. Smith and N. H. Cook, 1952, "The Rotary Cutting Tool," Transactions of the ASME, pp. 1065-1076.

For orthogonal cutting, there are two basic cutting surfaces of the workpiece: the work surface being the surface of the workpiece to be removed by the machining process; and the machined surface being the surface produced after the cutting tool passes. One additional surface may be considered for many practical machining operations: the transient surface: the surface generated during cutting by the major cutting edge. This surface is always located between the work surface and machined surface, as disclosed in G. R. Nagpal, 1999, "Machine Tool Engineering," Khanna Publishers. This last surface distinguishes orthogonal cutting from other machining processes, for example, in accordance with the shaping, planning, and broaching, where the cutting edge is perpendicular to the cutting speed. The machined surface is generated from the tool nose and minor cutting edge, both of which directly affect the integrity of the machined surface including residual stresses and finish quality.

Depending on the geometry of the cutting tool, various mechanics, thermal reactions, and tool wear conditions will arise during cutting. There is a wide array of cutting tools for various cutting methods, such as turning, milling, drilling, broaching, and reaming. However, there is a distinct lack of information regarding cutting tool geometry and its influence on the outcomes of machining operation. In the past, computers were not available to calculate parameters of such geometry. This made the task of reproducing proper tool geometries with manual machines difficult. Recent improvements in the machining industry have created more focus on tool design, primarily including tool materials and geometry, as a means of improving the performance of cutting tools.

In particular, the cutting tool geometry can be important because it may directly affect: (i) chip control, as tool geometry defines the direction of chip flow and the direction is important to control chip breakage and evacuation; (ii) productivity of machining, as the cutting feed per revolution is considered one of the major resources in increasing productivity because feed can be significantly increased by adjusting to tool cutting edge angle (for example, milling utilizes this parameter to a large extent where it is found that increasing the lead angle to 45° allows the feed rate to be increased approximately 1.4-fold and as a result, a wiper insert is required to reduce feed marks left on the machined surface due to the increased feed rates); (iii) tool life, as this geometry defines the magnitude and direction of the cutting force and its components and these include the sliding velocity at the tool-chip interface, the distribution of thermal energy released in machining, the temperature distribution in the cutting edge, etc., all of which affect tool life; (iv) the direction and magnitude of the cutting force and thus its components as four components of importance in the cutting tool geometry include the rake angle, the tool cutting edge angle, the tool minor cutting edge angle, and the inclination angle, all of which define the magnitudes of the orthogonal components of the cutting force; (v) quality, including surface integrity and residual stress of machining, as the comparison between tool geometry and the theoretical topography of the machined surface is common knowledge, and cutting geometry influences the machining residual stress which is realized when one recalls that the geometry defines to a great extent the state of stress in the deformation zone, for example, such as around the tool.

The geometry of prior art cutting tools, in particular the tool-in-hand tool geometry, has followed two basic standards: (a) the American National Standard B94.50-1975 "Basic Nomenclature and Definitions for Single-Point Cutting Tools 1", reaffirmed date 2003; and (b) ISO 3002/1 "Basic quantities in cutting and grinding—Part 1: Geometry of the active part of cutting tools—General terms, reference systems, tool and working angles, chip breakers", second edition 1982 Aug. 1. These standards have however failed to remain current and do not account for the significant changes in the machining industries and for the advances in metal cutting theory and practice.

Prior art SPRTs include tools created by Rotary Technologies™ and Mitsubishi Materials™ for hard turning processes. Each of these companies manufacture tools that are designed to be comprised of components that are proprietary to each company, such components including inserts, bearing assemblies, seals, hardware, and other components. These tools cannot be maintained in operation and serviced in an economical fashion. As the tools are comprised of proprietary components, both Rotary Technologies™ and Mitsubishi Materials™ can demand higher costs for the sale of their tools and the replacement of components of such tools. The prior art tools manufactured by each company further comprise complex assemblies, which further complicate the serviceability and maintenance of such tools.

For example, the Rotary Technologies™ SPRT for hard turning utilizes simple disk inserts with a cutting edge diameter of 25.4 mm. These inserts are not standard ISO inserts and therefore are not readily available from other tool manufacturing companies. The inside diameter of the insert causes the geometry of the tool to be proprietary to Rotary Technologies™ SPRT.

As another example, Mitsubishi Materials™ uses a 12.7 mm insert, but the geometry on the base of the insert (opposite the cutting edge) makes the tool unique compared to the ISO inserts commercially available. The use of large diameter inserts can result in improved surface quality, however they can simultaneously generate larger thrust forces during machining which can lead to increased tool chatter if the machine tool is not sufficiently rigid.

Further examples of prior art cutting tools are disclosed in the following patents and patent applications: U.S. Pat. No. 4,065,223 (Nelson); U.S. Pat. No. 4,640,159 (Stojanovski); U.S. Pat. No. 3,777,341 (Faber); Canadian Patent No. 1,335,152 (Massa); Canadian Patent No. 1,002,307 (Munro); U.S. Patent Application Publication No. 2001/0013995 (Hecht); Canadian Patent No. 832,722 (Cashman); EPO Patent No. GB2053765 (Kemmer); EPO Patent No. GB2352415A (Keith); U.S. Pat. No. 7,153,069 (Van Horssen); U.S. Patent Application Publication No. 2005/0047885 (Hyatt); U.S. Pat. No. 3,329,065 (Vaughn); U.S. Pat. No. 4,515,047 (Komanduri); U.S. Pat. No. 5,014,581 (Komanduri); U.S. Pat. No. 5,478,175 (Kraemer); U.S. Pat. No. 6,073,524 (Weiss); U.S. Pat. No. 6,135,680 (Szuba); U.S. Pat. No. 7,156,006 (Hyatt); and U.S. Pat. No. 7,325,471 (Massa).

SUMMARY OF THE INVENTION

In one aspect, the present disclosure relates to a rotary head tool that is a self-propelled rotary tool SPRT operable for machining that is round cutting involving hard turning, said rotary head tool characterized in that it comprises: a tool fixture; a tool support connectable to the tool fixture by a connection means in a manner that holds the tool support at an angle in relation to the tool fixture, said angle being pre-determined to achieve optimum cutting performance; and an insert incorporating a cutting edge that is removably attachable to the tool support by an attachment means; and whereby the insert positioned within the tools support attached to the tool fixture is operable to achieve machining that is round cutting involving hard turning when contact is made by the insert upon a workpiece rotated by a lathe.

The rotary head tool that may further be characterized in that any of the following are obtainable off-the-shelf: the connection means; the attachment means; and the insert.

The rotary head tool that may further be characterized in that the insert is a carbide insert with ISO designation RCMT 09 T3 00 that is of a 9.5 mm diameter.

The rotary head tool that may further be characterized in that the rotary head tool is operable for machining any of the following: Grade 5 Titanium; and AISI 4140 Steel.

The rotary head tool that may further be characterized in that the angle to achieve optimum cutting performance is configured to achieve one or more of the following: tool wear resistance; lengthened tool life; evenly distributed tool wear; formation of helical chips with small pitch dimensions to increase the safety of the machining process; lower cutting temperatures; and direct relation between feed rate and rotational speed.

The rotary head tool that may further be characterized in that the angle incorporates an inclination angle configured to direct discontinuous chips away form the user.

The rotary head tool that may further be characterized in that the inclination angle is 25°.

The rotary head tool that may further be characterized in that the angle incorporates a rake angle configured to achieve surface quality.

The rotary head tool that may further be characterized in that the rake angle is −5°.

The rotary head tool that may further be characterized in that the tool support is insertable in an opening shaped in the tool fixture, so that when the tool support is inserted in the opening in the tool fixture the upper portion of the tool support extends above the upper wall of the tool fixture and the lower portion of the tool support extends below the lower wall of the tool fixture.

The rotary head tool that may further be characterized in that the connection means is removeably connectable to the lower portion of the tool support that extends below the lower wall of the tool fixture when the tool support is inserted in the opening shaped in the tool fixture.

The rotary head tool that may further be characterized in that the geometry of the tool support is configured so that the insert is attachable to the tool support so that the cutting edge of the insert is concentric with the rotational axis.

The rotary head tool of that may further be characterized in that the tools support positions the insert at a small axial height away from rotating assembly, whereby bending and deflection of the component caused by the cutting forces is minimized.

The rotary head tool that may further be characterized in that the insert is of a smaller diameter than a bearing incorporated in the connection means and a stepped frustum design is incorporated in the rotary head tool that has a small axial height between the insert and the bearing, whereby bending moments are minimized.

In another aspect, the present disclosure relates to a rotary head tool is a self-propelled rotary tool SPRT operable for machining that is round cutting involving hard turning, said rotary head tool characterized in that it comprises: a tool fixture having a hole therein; a tool support incorporating an upper portion and a lower portion, said tool support being insertable within the hole in the tool fixture so that the upper portion of the tool support extends above the tool fixture and the lower portion of the tool support extends below the tool fixture when the tool support is inserted within the hole in the tool fixture; a bearing having a hole therein of a size to receive the lower portion of the tool support that extends below the tool fixture, said bearing being held in place encompassing the lower portion of the tool support by one or more washers and a threaded nut engageable with threading formed in the lower portion of the tool support; a first bearing having a hole therein of a size to encompass the tool support, said roller bearing being insertable within the hole in the tool fixture while encompassing the tool support; a second bearing having a hole therein of a size to encompass the tool support, said second bearing having a wider diameter than the hold in the tool fixture, and said second bearing being positionable between the first bearing and the upper portion of the tool support; and an insert incorporating a cutting edge being insertable within an indentation formed in a top edge of the upper portion of the tool support, said indentation having a threaded section cut therein to extend below the insert when said insert is inserted within the indentation, said insert having a hole with a threaded inner wall cut therein and being attached to the tool support by a threaded screw fitted within the hole in the insert and connected to the threaded section of the indentation; and whereby the insert fitted within the indentation is positioned at an angle in relation to the tool fixture, said angle being pre-determined to achieve optimum cutting performance.

The rotary head tool that may further be characterized in that the bearing is a needle roller thrust bearing that allows free rotation of the support tool.

The rotary head tool that may further be characterized in that the one or more washers are any of the following: a thrust washer; and a M8 washer.

The rotary head tool that may further be characterized in that the first bearing is a needle roller bearing that absorbs the radial forces applied to the cutting insert and maintains concentric rotation.

The rotary head tool that may further be characterized in that the second bearing is a needle roller thrust bearing that provides support in the axial direction.

The rotary head tool that may further be characterized in that the insert is a 9.5 mm insert available off-the-shelf and the screw is a M35×10 T15 Torx screw.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIG. 1 is a perspective view of a prior art orthogonal cutting tool.

FIG. 2 is a perspective view of a prior art oblique cutting tool.

FIG. 3 is an exploded perspective view of an embodiment of the present invention.

FIG. 4 is a perspective view of an embodiment of the present invention.

FIG. 5 is view of reference planes in turning operations of a prior art cutting tool.

FIG. 6 is view of tool angles for a prior art tool-in-hand system.

FIG. 7a is a perspective view of the geometry of prior art oblique cutting.

FIG. 7b is a view of the reference plane in prior art oblique cutting.

FIG. 8 is a perspective view of an embodiment of the present invention with an insert removed from the tool.

FIG. 9 is a diagram of the set-up of the tests performed incorporating an embodiment of the present invention.

FIG. 10 is a top view of a machine and tool set-up incorporating an embodiment of the present invention.

FIG. 11 is a table showing progression of tool wear during the machining of AISI 4140 Steel (wherein $V_w$=280 m/min, d=0.3 mm, and using a 9.5 mm carbide insert) results of a test of an embodiment of the present invention.

FIG. 12 is a table showing progression of tool wear during the machining of Grade 5 Titanium (wherein $V_w$=200 m/min, d=0.2 mm, and using a 9.5 mm carbide insert) results of a test of an embodiment of the present invention.

FIG. 13a is a table showing flank wear progression and effect on tool speed during the machining of AISI 4140 Steel for various feeds (wherein $V_w$=280 m/min, d=0.3 mm, and using a 9.5 mm carbide insert, and a feed of 0.3 mm/rev) results of a test of an embodiment of the present invention.

FIG. 13b is a table showing flank wear progression and effect on tool speed during the machining of AISI 4140 Steel for various feeds (wherein $V_w$=280 m/min, d=0.3 mm, and using a 9.5 mm carbide insert, and a feed of 0.225 mm/rev) results of a test of an embodiment of the present invention.

FIG. 13c is a table showing flank wear progression and effect on tool speed during the machining of AISI 4140 Steel for various feeds (wherein $V_w$=280 m/min, d=0.3 mm, and using a 9.5 mm carbide insert, and a feed of 0.15 mm/rev) results of a test of an embodiment of the present invention.

FIG. 14a is a table showing flank wear progression and effect on tool speed during the machining of Grade 5 Titanium for various feeds (wherein $V_w$=200 m/min, d=0.2 mm, and using a 9.5 mm carbide insert, and a feed of 0.3 mm/rev) results of a test of an embodiment of the present invention.

FIG. 14b is a table showing flank wear progression and effect on tool speed during the machining of Grade 5 Titanium for various feeds (wherein $V_w$=200 m/min, d=0.2 mm, and using a 9.5 mm carbide insert, and a feed of 0.225 mm/rev) results of a test of an embodiment of the present invention.

FIG. 14c is a table showing flank wear progression and effect on tool speed during the machining of Grade 5 Titanium for various feeds (wherein $V_w$=200 m/min, d=0.2 mm, and using a 9.5 mm carbide insert, and a feed of 0.15 mm/rev) results of a test of an embodiment of the present invention.

FIG. 15 is a table showing rotational speed of an embodiment of the present invention during machining of different materials at different feed rates (including AISI 4140 Steel wherein $V_w$=280 m/min, d=0.3 mm, and Grade 5 Titanium wherein $V_w$=200 m/min, d=0.2 mm, and using a 9.5 mm carbide insert) results of a test of an embodiment of the present invention.

FIG. 16 is a table showing surface roughness measurements during machining of AISI 4140 Steel (wherein $V_w$=280 m/min, d=0.3 mm, and using a 9.5 mm carbide insert) results of a test of an embodiment of the present invention.

FIG. 17 is a table showing surface roughness measurements during machining of Grade 5 Titanium at different feed rates (wherein $V_w$=200 m/min, d=0.2 mm, and using a 9.5 mm carbide insert) results of a test of an embodiment of the present invention.

FIG. 18 shows trace lines generated on the surface of hard turned Grade 5 Titanium workpiece sample machined using an embodiment of the present invention (wherein $V_w$=200 m/min, d=0.2 mm, and using a 9.5 mm carbide insert) results of a test of an embodiment of the present invention.

FIG. 19a shows typical chips obtained under different feeds during cutting of AISI 4140 Steel with an embodiment of the present invention (wherein $V_w$=280 m/min, d=0.3 mm, and using a 9.5 mm carbide insert) results of a test of an embodiment of the present invention.

FIG. 19b shows typical chips obtained under different feeds during cutting of AISI 4140 Steel with a fixed tool (wherein $V_w$=280 m/min, d=0.3 mm, and using a 9.5 mm carbide insert) results of a test of an embodiment of the present invention.

FIG. 20a shows typical chips obtained under different feeds during cutting of Grade 5 Titanium with an embodiment of the present invention (wherein $V_w$=200 m/min, d=0.2 mm, and using a 9.5 mm carbide insert) results of a test of an embodiment of the present invention.

FIG. 20b shows typical chips obtained under different feeds during cutting of Grade 5 Titanium with a fixed tool (wherein $V_w$=200 m/min, d=0.2 mm, and using a 9.5 mm carbide insert) results of a test of an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a rotary head tool that is a self-propelled rotary tool (SPRT) operable for round cutting involving hard turning. The rotary head tool comprises generally a toolholder, a tool that is removably or fixedly connectable to the toolholder, and an insert that that incorporates a cutting edge fittable into the tool. The toolholder is formed to hold the tool with the insert therein at a particular angle. Elements of the rotary head tool of the present invention, such as the insert, may be "off the shelf" elements and consequently the present invention may be produced at a low cost. Embodiments of the present invention are designed so that the rotary head tool provides economical benefits and affordability for the user and to provide performance benefits of SPRTs.

One embodiment of the present invention was tested on a turret-type CNC lathe by machining AISI 4140 Steel that was heat treated to 54-56HRC and Grade 5 Titanium (Ti-6A1-4V). Carbide inserts with ISO designation RCMT 09 T3 00 (9.5 mm diameter) were used during machining. Both the SPRT rotational speed and the workpiece surface roughness were measured during the test. Also, chips were collected and analyzed for each of the cutting conditions. The same procedure was followed during machining with the same tool which was denied the ability to rotate, therefore simulating a fixed tool with identical cutting conditions. Comparisons were made between tool life, surface roughness, and chip formation for the fixed tool and SPRT. Tool rotational speed was also analyzed for the SPRT.

The test offered results that highlighted aspects of the present invention as follows: (i) the self-propelled rotary tool for hard turning of the present invention may achieve superior tool wear resistance and lengthened tool life, relative to a fixed tool with identical configuration and cutting conditions, when machining difficult-to-cut hardened materials, for example, such as steel and titanium workpiece materials; (ii) evenly distributed tool wear may occur along the circumference of the rotary tool inserts of the present invention and there may be minimal crater wear; (iii) chip formation during machining with the SPRT may be in accordance with the configuration of the tool design of the present invention, the chips may be helical with small pitch dimensions, and may be discontinuous and segmented, and this may increase the safety of the present invention and decrease the machined surface problems associated with continuous chip formation of the present invention; (iv) lower cutting temperatures may be associated with SPRTs of the present invention, and this may lower the generation of plastic deformation and surface hardness alterations in the workpiece material; and (v) the effect of feed rate and SPRT rotational speed may be directly related in embodiments of the present invention.

In general, the present invention may provide improved performance and other advantages over prior art cutting tools. For example, the present invention produces less friction and heating than prior art cutting tools, and therefore the present invention may require less cooling than prior art cutting tools. As coolants are generally toxic, the present invention offers an environment advantage over the prior art in that less toxicity is introduced to the environment during use of the present invention. Moreover, the present invention may be run with lower energy run costs that prior art cutting tools. The present invention may further enjoy a longer tool life than prior art cutting tools.

The present invention may further provide a benefit over prior art cutting tools in that the present invention is easy to maintain for operation. This is in part due to the fact that off the shelf components that are easy to locate may be utilized in the present invention. Therefore, the cost of replacing parts is lower, as is the time to obtain replacement parts, than the costs for these activities relating to prior art cutting tools. Moreover, easy maintenance of the tool has the advantage that operator costs may be decreased as well when the present invention is utilized in comparison to operator costs for prior art tools.

The present invention may further provide a benefit over prior art cutting tools in that the design of the present invention causes it to be useable for turning hard to cut materials, including titanium. The present invention may also demonstrate high quality performance in surface roughness and chip formation. Moreover, various inserts for cutting may be incorporated in the present invention, including carbide, ceramic and other types of inserts. This can increase the types of materials that the present invention may be utilized to cut, in comparison to prior art cutting tools.

Hard turning of difficult-to-cut materials is an economical method of machining components with high surface quality and mechanical performance. After the heat treatment of a cast part (generally in a range of 50-65 HRC), hard turning allows for immediate finished-machining. Hard turning reduces the production time, sequence, cost, and energy consumed. In addition, dry machining offsets environmental concerns associated with the use of coolant in grinding operations as well as other common turning operations. The present invention being utilizable for hard turning may further offer all of these benefits and advantages.

Higher specific forces and temperatures in the contact area between the tool and workpiece lead to excessive tool wear. Generated tool wear affects the quality of the machined surface. Therefore, it is an advantage of the present invention that it minimizes tool wear and consequently the generated surface quality. Adverse effects associated with generated heat at the tool tip can be reduced by using cutting fluid. Embodiments of the present invention reduce adverse effects associated with generated heat at the tool tip by continuously providing a fresh cutting edge.

A skilled reader will recognize that many components for a variety of industries may be hard turned from difficult-to-cut materials. For example, a typical automotive component that is hard turned from difficult-to-cut materials is a transmission input shaft. These components demand high strength and wear resistance as they couple the vehicle's engine power to the transmission and remaining driveline. Embodiments of the present invention may be designed to be utilized for automotive components. A skilled reader will recognize that embodiments of the present invention may be utilized for other components of other industries as well.

The following terms will have the meanings listed below in this paper:

b: worn cutting tool edge length farthest away from the tool corner;
C: material constant;
$C_e$: tool cutting edge angle;
$C_{e1}$: tool minor (end) cutting edge angle;
d: depth of cut;
f: feed;
F: resultant shear force at the tool-chip interface;
$F_C$: cutting force;
$F_n$: force component normal to the shear plane;
$F_S$: shear force in the cutting velocity direction;
$F_T$: thrust force;
$F_u$: friction force along the rake face;
$F_v$: normal force to the rake face;
i: inclination angle; workpiece relative angle in the machine coordinate system;
$i_s$: inclination angle; workpiece absolute angle in rotary cutting;
$K_1$: material constant;
KT: crater depth;
L: overall workpiece length;
n: strain-hardening index;
N: normal force component at the tool-chip interface;
$P_f$: working plane;
$P_n$: cutting edge normal plane;
$P_o$: orthogonal plane;
$P_p$: tool back plane;
$P_r$: reference plane;
$P_s$: tool cutting edge plane;
R: resultant force at the deformation zone;
r: chip thickness ratio;
T: tool life;
$t_1$: undeformed chip thickness;
$t_2$: deformed chip thickness;
V, $V_c$: cutting velocity;
$VB_B$: flank wear land width;
$V_C$: chip velocity;
$V_{cr}$: relative chip flow velocity;
$V_f$: direction of cutting feed line;
$V_r$: rotating tool tangential velocity;
$V_S$: shear velocity;
$V_w$: workpiece velocity;

$V_{wr}$: workpiece relative cutting velocity;
$\alpha_f$: rake angle measured in the $p_f$ plane;
$\alpha_n$: rake angle measured in the $p_n$ plane;
$\alpha_o$: rake angle measured in the $p_o$ plane;
$\alpha_p$: rake angle measured in the $p_p$ plane;
$\beta_a$: friction angle;
$\gamma_f$: flank angle measured in the $p_f$ plane;
$\gamma_n$: flank angle measured in the $p_n$ plane;
$\gamma_o$: flank angle measured in the $p_o$ plane;
$\gamma p$: flank angle measured in the $p_p$ plane;
$\eta$: chip flow angle in conventional cutting; relative chip flow angle in rotary cutting;
$\gamma$: friction angle
$\sigma$: normal stress acting on the shear plane;
$\tau$: shear stress;
$\tau_0$: material constant;
$\phi$, $\Phi$: shear angle;
$\phi_n$: normal shear angle; and
$\psi$: tool approach angle Several studies offer commentary regarding on the effects of SPRT inclination angle and its effect on chip formation and cutting forces (M. C. Shaw, P. A. Smith and N. H. Cook, 1952, "The Rotary Cutting Tool," Transactions of the ASME, pp. 1065-1076; P. Chen, 1992, "High Performance Machining of SiC Whisker-reinforced Aluminum Composite by Self-Propelled Rotary Tools," CIRP, STC C, Vol. 41/1, pp. 59-62; E. J. A. Armarego, V. Karri and A. J. R. Smith, 1994, "Fundamental Studies of Driven and Self-Propelled Rotary Tool Cutting Process—II. Experimental Investigation," International Journal of Machining Tools & Manufacturing, Vol. 34, No. 6, pp. 803-815; and L. Li, 2005, "A Force Model for Self-Propelled Rotary Tools," MASc. Thesis, University of New Brunswick.).

In one embodiment of the present invention, the tool may be designed to incorporate an approximate inclination angle i of 25°. This configuration may provide significant reduction in cutting forces and thus machining power. The configuration may simultaneously generate discontinuous and segmented chips of difficult-to-cut materials. This chip formation may further eliminate any workpiece surface damage caused by continuous chips which can become tangled around the workpiece and lathe chuck. In addition, the inclination angle may also direct the discontinuous chips (which may be both hot and sharp) away from the machinist and towards the lathe bed.

Several studies offer commentary regarding rake angles in SPRTs, (M. C. Shaw, P. A. Smith and N. H. Cook, 1952, "The Rotary Cutting Tool," Transactions of the ASME, pp. 1065-1076; P. Chen, 1992, "High Performance Machining of SiC Whisker-reinforced Aluminum Composite by Self-Propelled Rotary Tools," CIRP, STC C, Vol. 41/1, pp. 59-62; E. J. A. Armarego, V. Karri and A. J. R. Smith, 1994, "Fundamental Studies of Driven and Self-Propelled Rotary Tool Cutting Process—II. Experimental Investigation," International Journal of Machining Tools & Manufacturing, Vol. 34, No. 6, pp. 803-815; L. Li, 2005, "A Force Model for Self-Propelled Rotary Tools," MASc. Thesis, University of New Brunswick.).

In one embodiment of the present invention, the tools may be configured to incorporate an approximate cutting edge rake angle of −5° to generate improved surface quality compared to SPRT tools configured to include to larger positive rake angles.

As shown in FIG. 3, in an embodiment of the present invention, an inclination angle i, and rake angle a, may be applied to the tool fixture 10 such that the posture of the cutting insert 2 may generate the results discussed herein.

The angle may be achieved by a portion of the tool fixture being shaped so as to hold the tool support in a particular angle when the tool support is connected to the tool fixture.

The present invention may comprise, a tool fixture 10, having a tool support 3 connected thereto. The tool fixture may incorporate an opening or hole therein whereby the tool support may be inserted within said opening in the tool fixture. Once inserted in the opening, an upper portion of the tool support may extend above an upper wall of the tool fixture, and a lower portion of the tool support may extend below a lower wall of the tool fixture. The tool support may be shaped to incorporate a flange or other shaping whereby the upper portion of the tool support is wider in diameter than the lower portion of the tool support. The upper portion of the tool support may also be wider in diameter than the opening in the tool fixture, wherein the lower portion of the tool support may be inserted in the tool fixture.

The upper portion of the tool support may further be shaped so that the portion positioned near to the upper wall of the tool fixture may be wider in diameter than the top edge of the tool support, and this portion specifically may incorporate a flange or other shaping. Above the flange the tool support may be shaped to gradually, or otherwise, taper to a stub end that is narrower than the flange. A skilled reader will recognize that the tool support may be shaped in a variety of manners, and that the particular shaping of the tool support may be directly related to functions of the tool support, such as shaping to allow the tool to achieve optimum cutting function.

The tool fixture 10 may have a bearing 6, for example, such as a needle roller thrust bearing connected thereto. The connection between the tool fixture and the bearing may be by a variety of connection means, for example, such as a means incorporating one or more nuts 9 and one or more washers 7, 8, for example, such as a M8 washer and a thrust washer.

The connection means may be attachable to the lower portion of the tool support. As shown in FIG. 3, the lower portion of the tool support may incorporate a threaded section, or other section capable of forming a connection with other components of the present invention. The bearing 6 and the one or more washers 7,8 may have a hole cut therein, whereby the lower portion of the tool support may be inserted within the hole in the bearing and the one or more washers, so that the bearing and the one or more washers are fitted upon the lower portion of the tool support when the tool support is inserted in the tool fixture. The bearing and washers are thereby fitted around the lower portion of the tool support that extends below the lower wall of the tool fixture. The nut may have a hole cut therein, and the interior wall of said hole may be threaded in a manner whereby the threaded portion of the lower portion of the tool support is engagable with the threads of the nut. The nut may be connected to the lower portion of the support tool and may thereby hold the bearing and washers in a position whereby the bearing is in contact with the lower wall of the tool fixture, and the one or more washers are positioned between the bearing and the nut. A skilled reader will recognize that other connection means may be incorporated in the present invention.

Above the upper wall of the tool fixture, being the side of the tool fixture that is distant form the connection means, one or more upper bearings may be positioned between the upper portion of the support tool and the upper wall of the tool fixture. The one or more upper bearings may be for example, such as a first upper bearing 5 that may be a needle roller bearing as an example, and a second upper bearing 4 that may be a needle roller thrust bearing as an example. The second upper bearing may be positioned between the first upper bearing and the upper portion of the tool support. The upper bearings may be operable to hold the tool support in a position that is at a predetermined angle in relation to the tool fixture. As discussed herein the angle of the tool support in relation to the tool fixture may cause the present invention to function in a particular manner and achieve particular benefits.

The top end of the upper portion of the tool support may incorporate a divot or other indentation. An insert 2 that is a cutting insert may be positioned within the indentation in the top of the upper portion of the tool support. The insert 2 may be held in place when inserted within the indentation of the tool support by an attachment means 1. The attachment means may be, for example, a screw, or any other attachment means.

In embodiments of the present invention the insert may be a RCMT 09 T3 00 (9.5 mm) insert, or any other readily available off-the-shelf insert. Other components of the present invention, including any of the bearing, the upper bearings, the net or the one or more washers may be readily available off-the-shelf components. The present invention may be configured so that any of the bearing and upper bearings may reduce the friction and energy consumption required by the present invention.

A skilled reader will recognize that while components are referenced herein as being incorporated in embodiments of the present invention that other types of components may be incorporated in the present invention. Specific references included herein are not to limit the invention, but to exemplify that readily available, off-the-shelf components can be incorporated in the present invention, which is a particular benefit of the present invention.

As shown in FIG. 4, an assembled embodiment of the present invention may incorporate the components in contact with each other so that the tool support 3 is inserted within an opening in the tool fixture 10, and the lower end of the tool support may extend below the opening in the tool fixture. The lower end of the tool support may be removeably attached to the nut 9 so that the one or more washers 7,8 and the bearing 6 are positioned between the nut and a portion of the tool support. The bearing 6 may be positioned above the one or more washers.

One or more upper bearings 4, 5 may be positioned between the tool fixture and a portion of the tool support that extends above the opening in the tool fixture. The insert 2 may be positioned in a depression, indentation, or other space within the upper end of the tool support, and an attachment means 1 may be utilized to removeably connect the insert to the tool support. In this manner the tool support is held in a particular position within and in relation to the tool fixture, and the insert is held in a particular position within and in relation to the tool support. The position of the tool support and the insert in embodiments of the present invention are discussed herein, as is the effect and purpose of such positioning for the operation of the tool of the present invention.

In embodiments of the present invention, the design and assembly of other components of the present invention may be related to incorporating readily available, 'off-the-shelf' components in the present invention. This provides the economical benefits to the machinist since part replacement can be conducted easily through the use of any industrial supply outlet. This provides improved service and/or maintenance when compared to other prior art SPRTs for hard turning that incorporate proprietary parts that must be ordered from a single supplier and may be expensive and time consuming to acquire.

The tools support 3, as shown in FIG. 3, of the present invention, in particular may be designed to be useable with other readily available components. The geometry of the tool support may be configured to provide: (i) a method of clamping the insert such that the cutting edge is concentric with the rotational axis; (ii) sufficient strength/rigidity to absorb cutting forces and not result in 'out-of-round' rotation; (iii) enclosure of the bearing components that protects them from cutting elements; such as metal chips and/or powder; (iv) a method that allows assembly to the tool fixture while still permitting rotation of the bearing component; and (v) assemblage that is not cumbersome or difficult for the operator to maintain and service, as well as provide quick and easy changing of cutting inserts.

To incorporate some readily available off-the-shelf components in embodiments of the present invention may require specific configuration of elements and the assembly of the present invention. For example, some readily available off-the-shelf needle roller thrust bearings 5 have a much larger outside diameter than the cutting insert 2. A needle roller thrust type bearing 6 may be chosen since such a bearing may require narrow axial space and can maintain substantial axial loading. The tool support 3 must fix the insert 2 at a small axial height away from rotating assembly to minimize bending and deflection of the component caused by the cutting forces. Therefore, to fix the insert (that is of a smaller diameter) and enclose a thrust bearing (that is of a much larger diameter) negates tool support geometry similar to a frustum. In embodiments of the present invention, a needle roller thrust bearing 6, for example, such as a bearing with an outside diameter of 21 mm, may be incorporated in the present invention.

The difference in diameters from insert to bearing may generate a tall frustum support geometry. The present invention may be configured in accordance with a 'stepped' frustum design, as shown in FIG. 3 and FIG. 4. This geometry has a small axial height between the insert and thrust bearing; thus minimizing bending moments compared to a non-'stepped' frustum geometry. Given the inclination and rake angles set by the tool fixture, the reduced axial height limits the range of machinable workpiece diameters.

In some embodiments of the present invention, the primary application of the SPRT for turning may be for automotive and powertrain-related components; shafts that are normally hard-to-cut materials and relatively small in diameter. Therefore, the height of the support that minimizes deflection, may allow for workpiece diameters, for example, such as approximately up to 38.1 mm, that may be the average diameter of automobile transmission input shafts, as an example.

The deflection criteria of one embodiment of the present invention may be based on the results from a simplified finite element analysis (FEA) of the SPRT assembly exposed dynamically to 1000 N (being the maximum cutting forces discussed in other works including: P. Chen, 1992, "High Performance Machining of SiC Whisker-reinforced Aluminum Composite by Self-Propelled Rotary Tools," CIRP, STC C, Vol. 41/1, pp. 59-62; and L. Li, 2005, "A Force Model for Self-Propelled Rotary Tools," MASc. Thesis, University of New Brunswick) in the x, y, and z cutting force directions at a point on the cutting edge. The maximum deflection may be approximately 0.2 mm, which is minimal and may result in reasonable runout when considering vibration and surface quality. The complete rotating assembly of the SPRT of the present invention may be as shown in FIG. 4.

As shown in FIG. 4, in one embodiment of the present invention the tool support 3 encloses the thrust bearing 4 and maintains clearance with the tool fixture 10 such that machined material cannot enter. This provides protection from possible damage to the bearing rollers, races, and cages. Below the thrust bearing 4, a needle roller bearing 5 is assembled to provide additional rotational freedom to the tool support. Given the thrust bearing is only capable of providing support in the axial direction, this needle roller 5 is inserted to absorb the radial forces applied to the cutting insert and maintain concentric rotation. The tall needle rollers provide support along the majority of the surface of the tool support 3 that is surrounded by the tool fixture 10. To maintain rigidity with the tool fixture, the bottom portion of the tool support is clamped with two jam-nuts, which eliminate any axial movement. A needle roller thrust bearing 6 and thrust washer 7 is also assembled between the jam-nuts and tool fixture to allow free rotation of the support. In addition, the insert is fixed concentrically in the support by a tapered pocket that conforms to the flank surface of the cutting insert.

By this configuration the insert's outer circumference is used for centering the cutting edge which is more accurate than centrally locating the insert with the inner hole; degree of concentricity between the cutting edge and inner hole may not be true given the inserts are not originally designed for rotary cutting tools. The insert is seated in the tool support and a screw is used to clamp it. To provide ease of assembly, two parallel faces on the support are designed just below the insert, set a distance, for example, such as a distance of 10 mm apart, such that an ordinary wrench can be used to help torque the insert screw and the jam-nuts.

The configuration of embodiments of the present invention operable for hard turning may provide simplicity in assembly, operation, and service and/or maintenance. There is no requirement for lubrication of the bearings since they are designed for dry working environments, however, if cutting fluids are used during the machining operation, they will not cause any damage to the components. Not including the tool support 3 and the tool fixture 10, all remaining parts are commercially available as 'off-the-shelf' components. In addition, the present invention may incorporate the smallest cutting insert diameter of any SPRT design. This provides the additional benefits to SPRTs by also obtaining turned profiles closer to stepped geometrical designs (due to reduce cutting tool radius) while also reducing thrust cutting forces.

Aspects of Cutting Tool Design and Configuration

There are several aspects that can be involved in the design and configuration of a cutting tool. To exemplify and highlight some of the advantages and the design and configuration of the present invention in comparison to prior art cutting tools several of these aspects are presented in this paper.

Hard turning is process that presents certain challenges to tool configuration. Machining by turning basically generates cylindrical forms with a single point tool. The cutting tool remains stationary while the workpiece rotates. This process is one of the most straightforward metal cutting methods with relatively uncomplicated definitions. However, being one of the most widely used machining methods, turning has become a highly optimized process. To maintain high efficiency requires the thorough appraisal of the various factors involved in applications.

In cutting tool geometry generally, and in particular for turning processes, there are a number of angles measured in various planes. For example, reference planes in turning operations are discussed in V. P. Astakov, 2008, "Tools (Geometry and Material) and Tool Wear," in Machining: Fundamentals and Recent Advances, J. P. Davim, Portugal, Springer, pp. 29-57); and P. L. B. Oxley, 1989, "The Mechanics of Machining: An Analytical Approach to Assessing Machinability," Ellis Horwood Limited, New York, N.Y.).

As shown in FIG. 5, a tool-in-hand coordinate system 24, the main reference plane $P_r$, is defined as perpendicular to the assumed direction of primary motion (the z-direction in the figure). The assumed direction of the cutting feed line, $v_f$, is also included along with the major cutting edge (1-2) and the minor cutting edge (1-3). This coordinate system also includes five basic planes which are defined relative to the reference plane $P_r$, some of which are included in the figure below (V. P. Astakov, 1998, "Metal Cutting Mechanics," CRC, Boca Raton, USA).: (i) the working plane $P_r$ contains the assumed feed motion direction and is positioned perpendicular to the main reference plane $P_r$; (ii) perpendicular to $P_r$ is the cutting edge plane $P_s$, which includes the major cutting edge (1-2 as shown in FIG. 5); (iii) coincident with the zy-plane and therefore perpendicular to $P_r$ and $P_f$ is the tool back plane $P_p$ (not shown in FIG. 5); (iv) the orthogonal plane $P_o$ is perpendicular to the projection of the cutting edge onto the reference plane (as shown in FIG. 5 as directed through point 0' selected on the projection of the cutting edge); and $P_n$ is the cutting edge normal plane which is perpendicular to the cutting edge.

To further define the geometry of the cutting tool, a set of basic tool angles fall within the corresponding reference planes outlined in FIG. 5, said basic tool angles 26 are shown in FIG. 6. The definitions of these basic tool angles for the tool-in-hand coordinate system are as follows: $\psi$ is the tool approach angle; the acute angle that $P_s$ makes with $P_p$ and is measured in the reference plane as shown in FIG. 6; rake angle is the angle between the reference plane $P_r$, and the tool rake face, and the rake angle is defined as the normal rake angle $\alpha_n$, if the angle is measured in the cutting edge normal plane $P_n$, also, different rake angles $\alpha_f$, $\alpha_p$ and $\alpha_o$ are defined as shown in FIG. 6; flank angle is the angle between the tool cutting edge plane $P_s$ and the tool flank face, and similarly, if the flank angle is measured in the cutting edge normal plane, the angle is referred to as the normal flank angle, $\gamma_n$. Different flank angles $\gamma_f$, $\gamma_p$, and $\gamma_o$ are defined as shown in FIG. 6; orientation and inclination of the cutting edge are specified in the tool cutting edge plane $P_s$, and in this plane, the cutting edge inclination angle i (or $i_s$) is the angle between the cutting edge and the reference plane; and the tool cutting edge angle, $C_e$, is shown in FIG. 6, and this angle is defined as the acute angle that the tool cutting edge plane makes with the assumed working plane and is measured in the reference plane $P_r$, also, the tool minor (end) cutting edge angle, $C_{e1}$, is the acute angle that the minor cutting edge plane makes with the assumed working plane and is measured in the reference plane $P_r$. FIG. 6 generally shows tool angles for the tool-in-hand system as discussed in G. R. Nagpal, 1999, "Machine Tool Engineering," Khanna Publishers.

The flank and rake angles are zero when the corresponding construction planes coincide. The measuring angles become positive when the generated angle produces a tool with less material in comparison to the definition of the zero angles. For the tool approach angle, it is considered positive when directed in the clockwise direction.

There are three basic systems in which the tool geometry should be considered, namely, the tool-in-hand, tool-in-machine (holder) and tool-in-use geometry. Therefore, it should be appreciated that the necessity of such consideration would entail not only the understanding of the tool geometry as it appears on drawings or shown in catalogues of the tool manufacturers, but that it can be significantly altered through a wide range depending upon the tool holder used. That is, the resultant geometry can be considerably altered depending on the location of the tool in the machine relative to the workpiece.

A skilled reader will recognize that there is a plethora of different angles that are inherent to the tool geometry which can also be translated and altered when coupled with the tool holder and workpiece. Some of these angles are important to elaborate on because of their influence during a machining operation, especially during turning.

The tool cutting edge angle affects the cutting process to a large degree since given a specific feed and cutting depth, it directly affects the uncut chip thickness as well as the chip width and therefore tool life. To expand, when $C_e$ decreases, the width of the chip increases as the active portion of the cutting edge also increases. As a result, there is an improvement in heat removal from the tool and therefore increased tool life. For example, in rough turning of carbon steels, a small change from 45° to 30° has lead to five-times improved tool life. There are however drawbacks, one of which includes an increase in the radial cutting force component, which can result in reduced accuracy and stability of machining especially if the tool holder and the workpiece fixture cannot withstand the increased load (as discussed in V. P. Astakov, 2008, "Tools (Geometry and Material) and Tool Wear," in Machining: Fundamentals and Recent Advances, J. P. Davim, Portugal, Springer, pp. 29-57).

The tool rake angle also has a significant impact during the cutting process. The rake angle can be measured as positive, negative, or zero (also referred to as neutral). Generally, an increase in the rake angle reduces machining horsepower consumed per unit volume of the current workpiece layer being removed at a rate of approximately 1% per degree starting from $\alpha=-20°$. This results in reductions in both the cutting force and tool-chip contact temperature. So, it would seem that a high positive rake angle would be ideal for practical machining. Application, however, indicates there are a number of drawbacks of increasing the rake angle. The largest impact is that the cutting tool tip loses strength as the rake angle increases (increased removal of tool material).

The normal force that acts on the tool-chip interface causes bending of the cutting tool tip which results in weakened tool strength followed by tool chipping. Also, the tool-chip interface contact area diminishes with the rake angle which shifts the normal force closer to the cutting edge, however, when cutting with a negative rake angle, the normal force causes compression of the tool material. Since tool materials tend to have high compressive strength, the cutting edge strength is much higher and can survive. In addition, an increased rake angle also shifts the maximum contact temperature at the tool-chip interface closer to the cutting edge which decreases the tool life as discussed in V. P. Astakov, 2006, "Tribology of Metal Cutting," Elsevier: London. The rake angle is not an independent variable as it is also affected by the tool holder and not just the cutting tool insert geometry. Further, application of chip breakers often dictates the resulting rake angle rather than other parameters of the cutting process such as power consumption, cutting force, and tool life.

Flank angle also has a large impact on the tool life. If the flank angle $\gamma=0°$ then the flank surface is contacting the workpiece surface. Due to the phenomenon of spring-back of the workpiece material, there is an increased frictional force developed on the touching surfaces which eventually leads to tool breakage. Therefore, the flank angle affects cutting performance by decreasing the rubbing on the tool's flank surfaces. Also, as the flank angle increases, more material is removed from the cutting tool insert and the strength of the adjacent cutting edge as well as the heat dissipation of the tool is significantly reduced. Both of these factors result in decreased tool life. However, an advantage of an increased flank angle includes a decreased cutting edge radius which results in reduced frictional and deformation components of the flank force (more noticeable with small feeds). This generates less heat and therefore increases tool life.

Several tool materials exist in the metalworking industry today, which include high-carbon steels, ceramics, and diamonds. It is important to note the differences between the tool materials and how each type is best suited for a particular application. The three most significant properties of a tool material are: (i) hardness: a resistance to the penetration of an indenter, which is a property that directly correlates to the strength of the cutting tool material (as discussed in E. Isakov, 2004, "Engineering Formulas for Metal Cutting," Industrial, New York, N.Y.), so that if a tool material is able to maintain high hardness at elevated temperatures, it is referred to as 'hot hardness'; (ii) toughness: the ability of a material to absorb energy up until the point of fracture, so that the higher the fracture toughness, the greater the resistance to shock loading, chipping and fracturing, vibration, runouts, and other sources of imperfections in the machining system, and for tool materials, hardness and toughness change in opposite directions; thus a market trend has been to develop tool materials that have increased toughness with maintained hardness; and (iii) wear resistance: the point of reaching acceptable tool life before tools are replaced.

To be precise, wear resistance is not a true characteristic of tool materials. Metalworking tool wear is the result of a complicated combination of physical, chemical, and thermomechanical phenomena. Due to the various mechanisms of wear, for example, such as abrasion, adhesion, diffusion, oxidation, and other mechanisms, acting simultaneously, it is difficult to identify the dominant mode of wear, and therefore provide the optimal defense. A prior art experimental device used by tool material manufacturers to characterize wear resistance is pin-on-disk tribometer, however, as discussed in V. P. Astakov, 2006, "Tribology of Metal Cutting," Elsevier: London, both the method and results are considered unacceptable.

There are a number of different tool materials available today, for example, such as carbides, ceramics, polycrystalline cubic boron nitrides (PCBNs), polycrystalline diamonds (PCDs), and solid or thick film diamond (SFDs or TFDs).

Prior art carbide cutting tool materials include compositions of silicone and titanium carbides (also known as cerments), as well as tungsten carbides and other compounds of a metal (such as Ti, W, Cr, Zr) or metalloid (B, Si) and carbon. A large advantage of carbides is that they have excellent wear resistance and high hot hardness. Typically, a carbide cutting tool consists of carbide particles bound together in a cobalt matrix by a sintering process. The amount of cobalt significantly affects the properties of the carbide cutting insert. As the cobalt content increases (from a range of 3-20%) the toughness of the cutting insert increases while its hardness and strength decrease. Metal cutting productivity can be increased substantially without sacrificing insert wear resistance if the insert is combined with special coating materials and is layered in a particular sequence.

Selecting the optimum grade of carbide material for a cutting insert can involve a variety of grades, coatings, coolants, and cutting conditions which vary from workpiece to workpiece. Once the carbide grade has been selected, a thin-film hard coating and/or thermal diffusion process can be considered. Currently, 85% of carbide tools and 40% of super-hard tools used in the metalworking industry are coated (as discussed in V. P. Astakov, 2006, "Tribology of Metal Cutting," Elsevier: London). The carbide materials provide excellent substrates for coatings such as TiN, TiAlN, TiCN, solid lubricant coatings, and multilayer coatings. Coatings provide improved tool life and increase the performance of carbide tools in high-productivity, high-speed and feed cutting conditions, dry machining, and the machining of difficult-to-cut materials. In detail, the benefits of coatings are: (i) increased surface hardness for greater wear resistance; (ii) increased resistance to abrasion, adhesion, flank, and crater wear; (iii) reduced coefficient of friction to allow increased chip sliding and thus reduce cutting forces, prevent adhesion to the contact surfaces, and reduce heat generated due to chip sliding; (iv) reduced absorption of thermal energy into the tool; (v) increased corrosion and oxidation resistance; and (vi) improved surface quality of finished parts.

The most common coatings for carbides applied in single or multi-layers in the prior art have been defined as comprising four basic groups of coatings (as discussed in F. Klocke and T. Krieg, 1999, "Coated Tool for Metal Cutting—Features and Applications," Annals of CIRP 48: Vol. 48, pp. 515-525). These include titanium based coating materials where the metallic phase is often supplemented with metals such as Al and Cr, which are added to improve particular properties such as hardness or oxidation resistance. These types of coatings are basic physical vapor deposition (PVD) coatings.

Ceramic tool materials are composed primarily of fine grained aluminum oxide, cold-pressed into the desired insert geometry and sintered under high pressure and temperature. White ceramics refer to pure aluminum oxide ceramics while the addition of titanium or zirconium oxide results in black cermets (not related to carbide cermets as mentioned earlier). Aluminum oxide ceramics are brittle and primarily used for hardened steels. Another form of ceramic cutting material is silicon nitride which is relatively soft and tough and used for cast irons. Typically the higher proportion of aluminum results in a harder material whereas the higher proportion of silicon nitride results in a tougher material.

Ceramics provide high hardness with abrasive wear resistance at elevated temperatures. As tool inserts become hotter, they typically become softer, however, ceramics react at a much slower rate because of the lack of metal content. Ceramic cutting materials also offer chemical stability inasmuch as they do not react with the workpiece material, for example there may be no diffusion wear. This is a significant limitation of carbide materials in high-speed machining processes. Ceramic cutting inserts are ideal for machining most ferrous materials as well as superalloys. For copper, brass and aluminium, use of ceramics may cause formation of built-up edge.

Ceramics may also be costly and brittle. In an attempt to protect the cutting edges, a heavy edge preparation such as T-land (type of chamfering) or honed edge is implemented into the ceramic cutting insert. Coatings are not common with ceramic cutting inserts due to the high cost and weak adhesion between the coating materials and ceramic substrates. However, tool wear of ceramic cutting inserts is improved by the adoption of small grain sizes. In hard turning applications, ceramics cutting inserts have provided up to 20 times improved tool life.

Using cubic boron nitride crystals, CBN inserts are created through sintering at high-pressure and temperature with a binder and bonded to a tungsten carbide substrate. The binder (usually a metallic or ceramic matrix) provides the chemical stability which allows the polycrystalline cubic boron nitride (PCBN) to withstand the abuse in high-speed machining environments. High impact resistance is provided by the tungsten carbide substrate which allows for the depths of cuts and high speeds associated with machining of hardened ferrous materials. PCBN tools also offer the following benefits: (i) capable of machining hardened and heat-treated steels; (ii) excellent surface finishes that do not require further grinding; (iii) high productivity rate that can exceed four times higher than that in grinding; (iv) excellent abrasion resistance; twice that of ceramics and ten times that of carbide; and (v) excellent heat dissipation and wear resistance.

Part of the contribution to the high quality of cutting of PCBN tools is by cutting edge preparation. This can be applied as a small hone for finishing cast irons, or as a T-land for heavy roughing of white iron, or as a combination of these two preparations. The practice of applying a T-land to PCBN inserts used for cutting super-hard materials has been deemed necessary for extending tool life. However, this has become so widely accepted that it is rare to find a PCBN insert without any chamfering. It has been found that this type of edge preparation actually produces suboptimal results and limits tool life and diminishes cutting performance. Further application of newer edge preparation alternatives are required to make a larger improvement to the tool life of these inserts for the super-hard materials that are increasing in popularity. PCBN tools are commonly used for machining cast irons, sintered iron, superalloys, and hardened steels.

Being one of the most versatile engineering materials in the world, diamond is the strongest and hardest known substrate with the highest thermal conductivity of any material at room temperature and low surface friction. To date, no other material, natural or man-made can match these unique properties (as discussed in E. D. Whitney, 1994, "Ceramic Cutting Tools. Materials, Development and Performance," Noyes, Westwood, N.J.).

PCD tools are manufactured using a layer of industrial crystals which consist of a mixture of graphite and a catalyst (typically nickel) under 7000 MPa of pressure and at a temperature of 1800 C, coated on a carbide substrate and further subjected to high-pressure and temperature (6000 MPa and 1400° C., respectively).

PCD tools can provide up to 500 times the abrasion resistance of most tungsten carbide tools and also provide high thermal conductivity. As a result, PCD tools have replaced many carbide, ceramics and natural diamond in many applications, ranging from turning, boring, milling, slotting and chamfering of a plethora of materials. A substantial benefit of PCD tools is that their extended tool life and resulting increased productivity more than offsets the higher initial cost by lowering the unit cost of parts produced. Further, PCD tools can be re-sharpened after extended use. However, having high abrasion resistance and hardness, PCDs have relatively low toughness. To improve this limitation, structural changes have been implemented which includes the combination of different sized diamond particles which provides an increased packing density, resulting in higher adjacency of diamond grains. This enhances the chipping resistance of the cutting edge and also provides a smoother transition between the layers of the ground edge as opposed to the micro-serrated edge normally seen in most other PCD compositions.

A large contribution to tool failure is tool wear. The failure of tools is most commonly believed to be premature failure, for example, such as tool breakage, and by progressive tool wear (as discussed in "Modern Metal Cutting: A Practical Handbook," Sandvik Coromart). Most often tool wear depends on tool geometry and material, workpiece materials, cutting parameters (for example, such as cutting speed, feed rate and depth of cut), cutting fluids, and machine-tool characteristics.

Typically tool wear is a gradual process and there are two basic and most important measured forms of wear zones in cutting tools: flank wear and crater wear. Flank wear is more closely monitored to determine the degree of tool wear. The flank wear land width, $VB_B$, is measured within zone B in the cutting edge plane $P_s$, as shown in FIG. 5, perpendicular to the major cutting edge, and from the position of the original major cutting edge. The crater depth, KT is measured as a maximum distance between the crater cavity bottom and the original face in region B. A toolmaker's microscope is most commonly used to measure tool wear or a stylus type instrument similar to a profilometer can be used.

To illustrate the relationship between flank (rake) wear and cutting time $\tau_m$, or the overall workpiece length, L, tool wear curves can provide a comparison. The flank wear width progresses to a maximum $VB_B$ after certain length of cutting. The progression in flank wear curves can be divided into three noticeable regions; the first region, is the result of the initial or primary wear. Here exists a high wear rate as the result of accelerated wear of the tool layers damaged during the manufacturing or re-sharpening of the cutting inserts. The adjacent region, withstands a steady rate of tool wear and is the normal operating region for the cutting insert. The last region, is an accelerated wear region where high cutting forces, temperatures, and severe tool vibrations occur, thus the tool should not be operated within this region. In the best interests of lowering tool wear, cutting speeds should be of prime concern.

A relationship between these parameters may be reflected where there are three different cutting speeds (while maintaining all other cutting conditions), which are $v_1$, $v_2$, and $v_3$. Since $v_3$ is much higher than $v_1$, and $v_2$, it demonstrates a faster rate of tool wear. Once the tool wear reaches the maximum allowed wear, the tool has become worn out (as is discussed in V. P. Astakov, 2008, "Tools (Geometry and Material) and Tool Wear," in Machining: Fundamentals and Recent Advances, J. P. Davim, Portugal, Springer, pp. 29-57).

During normal operation, $VB_{Bc}$, is selected from a range of 0.15-1.00 mm depending upon the type of machining operation, the condition of the machine tool, and the quality requirements of the finished product. $T_i$ is the corresponding tool life to a cutting speed $v_i$, and similar matches for $T_2$, $v_2$, and $T_3$, $v_3$. If the integrity of the machined surface allows it, the curve of maximum wear instead of the line of equal wear should be used. Therefore, the range of tool life between lower and higher cutting speeds becomes less significant and a higher productivity rate can be achieved.

There are several forms of mechanisms that cause tool wear, which are: abrasion, diffusion, oxidation, fatigue, and adhesion. These mechanisms can be described as follows: (i) abrasion: wear that occurs when hard particles (carried by the chip flow) abrade and remove tool material and can also occur due to chip form or a chemical reaction between cutting fluids and chips (as with powdered metal steels which form powder chips), also called erosive wear; (ii) diffusion: during wear by diffusion, a constituent of the tool material diffuses into a solid solution with the chip material, weakening the tool surface and results in a wear crater on the rake face of the tool; (iii) oxidation: this wear mechanism occurs when constituents of the tool react with the atmospheric oxygen; (iv) thermal fatigue: thermal cycling and thermal shock can lead to early failure with PCBN tooling and can be associated with both interrupted turning and milling (which by nature is interrupted); and (v) adhesion: one of the most significant types of wear at lower cutting speeds, adhesion occurs when small particles of the tool adhere or weld to the chip due to friction and are removed from the tool surface.

One of the most important variables in machining, tool life must be properly gauged in order to ensure that considerable time is not lost if and when a tool is replaced and reset. Therefore, tool life may be defined as the time a tool will cut to a desired level of quality and is expressed in minutes between changes of the cutting tool. Continued cutting past the tool life expectancy results in further wear and ultimately failure of the cutting tool which increases the surface roughness and decreases the dimensional accuracy of the workpiece.

Easily determined quantitatively, tool wear is most often used as a lifetime criterion. The flank wear land $VB_B$ is often used as the criterion given its influence on the workpiece surface quality and accuracy. Wear curves based on flank wear and cutting time are plotted for various cutting speeds as well as the tool life (as discussed in F. W. Taylor, 1907, "On the Art of Cutting Metals," Transactions of the ASME 28: pp. 31-58).

As presented in F. W. Taylor, 1907, "On the Art of Cutting Metals," Transactions of the ASME 28: pp. 31-58), the following algebraic expression can be used to model tool life:

$$V_c T^n = C \qquad (2.1)$$

where $V_c$ is the cutting speed (m/min), T is the tool life (min) taken to develop a certain flank wear land ($VB_B$), n is an exponent that depends on the cutting parameters and C is a constant. At T=1 min, C is equal to the speed. From the above formula and for each combination of tool material and workpiece and each cutting parameter, there is a distinct n and C value that is determined experimentally. Therefore, by data such as that shown in FIG. 2.9, two points on a plot can be used to determine the values of n and C for a given cutting scenario and thus predict and expand on the expected tool life.

From the above tool life formula, it is possible to see that only the cutting speed is a parameter that affects the estimated tool life. This is the result of Taylor obtaining the formula through his work using high-carbon and high-speed steels as tool materials. Once carbides became a more common cutting material, it was found that both cutting feed and the depth of cut were also significant in determining the expected tool life. Therefore, Taylor's formula became modified and accommodates the newer revisions as follows:

$$V_c T^n f^a d^b = C \qquad (2.2)$$

where d is the depth of cut (mm) and f is the feed (mm/rev). The exponents a and b are determined experimentally for each combination of the cutting conditions.

In summation, tool life depends on: cutting parameters (as listed above); tool material and geometry; type and condition of cutting fluid used; workpiece material (i.e. chemical composition, hardness, strength, toughness, homogeneity and inclusions); and the machining operation. Therefore, it can be a difficult task to develop a universal tool life criterion.

Understanding the mechanics of chip formation during machining will assist in providing the basis for prediction of the various interactions taking place. This includes deformations, temperatures and forces as they determine the quality of the machining process and finished product. For example, high temperatures in the cutting region would result in softening of the workpiece material which will affect the cutting forces. However, high cutting temperatures will be detrimental to the cutting tool material. The cutting forces will determine the machine tool power requirements and the loads transferred to the tool's packaged bearing assemblies as well as any deflections of the workpiece, cutting tool, fixture, and machine tool structure. Cutting tool geometry plays a large role in both cutting temperatures and forces generated during a machining process. In addition, cutting speed, feed, and depth of cut have significant influence on cutting forces generated. As a result, an understanding of what is happening during the metal removal process is necessary for the study of machining mechanics as well as for successful tool design construction.

Chips formed can be classified into three different groups: discontinuous chips, continuous chips, and continuous chips with built-up edge (BUE) (E. M. Trent and P. K. Wright, 2000, "Metal Cutting," Butterworth-Heinemann). Factors such as tool geometry, workpiece material properties, tool material properties, and cutting parameters affect the formation of chips. Discontinuous chips are formed during machining of brittle materials at low cutting speeds, in addition to large undeformed chip thickness and small to negative rake angles. Continuous chips are formed when machining with ductile materials at high cutting speeds with small-undeformed chip thickness, large rake angles, and appropriate coolant. Continuous chips with BUE are formed during the machining of workpiece materials that have strong adhesion with the cutting tool material, large undeformed chip thickness, and small rake angles. Both discontinuous and continuous with BUE chip formations are undesirable since fluctuating forces are generated which result in poor surface quality and dimensional accuracy. Stable force generation follows from the formation of continuous chips and thus develops a final product with better surface quality and dimensional accuracy.

To gain a fundamental understanding of the forces involved during the metal removal process, Merchant's model illustrates the relations at the shear zone and the tool-chip interface. It follows the concept of a thin primary deformation zone model for the orthogonal cutting process. It is assumed that the workpiece is an ideal perfectly rigid plastic material. In addition, the following assumptions are also made (as discussed in G. R. Nagpal, 1999, "Machine Tool Engineering," Khanna Publishers.): (i) continuous chips without BUE are formed; (ii) cutting velocity is held constant; (iii) the cutting tool has a sharp cutting edge and there are no flank face interactions; and (iv) the chip is considered to remain in stable equilibrium under the counteraction of resultant forces in the shear zone and tool-chip interface. An example of an orthogonal cutting process 28, is shown in FIG. 7a, and an example of the cutting planes 30 is shown in FIG. 7b.

The fundamental orthogonal cutting forces can be simplified in representation to a force circle (as discussed in M. R. Merchant, 1945, "Mechanics of the Metal Cutting Process. I. Orthogonal Cutting and a Type 2 Chip," Journal of Applied Physics, Vol. 16, pp. 267-275). The resultant force R, passes through the center of the circle, and the remaining forces can be balanced through a geometrical solution of the circle. Some of the relations developed include:

$$F_C = R \cos(\lambda - \alpha) \tag{2.3}$$

$$F_T = R \sin(\lambda - \alpha) \tag{2.4}$$

$$F = R \sin \lambda \tag{2.5}$$

$$N = R \cos(\lambda) \tag{2.6}$$

The resultant force component R along the shear plane can be resolved into the shear force $F_s$, and a normal force $F_n$ acting perpendicular to the shear plane. For simplicity, the resultant force can be resolved into two components: the cutting force $F_c$, and the thrust force component $F_T$. Both the cutting force and thrust force can be easily measured using a tool dynamometer.

The shear angle φ can be expressed in terms of the rake angle α and the friction angle λ and can be adjusted by applying the minimum energy principle to minimize energy consumption during cutting. According the Merchant model, the shear angle can be developed as:

$$\varphi = \frac{\pi}{4} - \frac{1}{2}(\lambda - \alpha) \tag{2.8}$$

In order to decrease the forces and power consumed during cutting, the shear angle must be increased. To do so, the above expression indicates that the friction coefficient (equivalent to tan λ.) between the tool and the chip must be decreased by using lubricants or materials with lower coefficients of friction. In addition, the rake angle of the cutting tool must be increased to the limit the weakened cutting edge can withstand from the pressure and friction load exerted by the chip at the rake face contact zone.

When the shear stress τ, at the shear plane and the friction angle λ, at the tool chip interface are known, plus cutting conditions and given tool geometry, according to the equations above, the orthogonal cutting forces can be predicted.

Through experiment, a parameter called the chip thickness ratio r, which is the ratio of undeformed chip thickness $t_1$ to the deformed chip thickness $t_2$, the shear angle can also be obtained from the following expression:

$$\tan\phi = \frac{r\cos\alpha}{1 - r\sin\alpha} \tag{2.9}$$

During machining of metals, the shear stress along the shear plane is not constant, thus there will be disagreement between the measured and theoretically calculated shear angle (as discussed in E. M. Trent and P. K. Wright, 2000, "Metal Cutting," Butterworth-Heinemann). Merchant followed by modifying his model with the assumption that the shear stress is a function of the normal stress acting on the shear plane, which can be expressed as:

$$\tau = \tau_0 + K_1 \sigma \tag{2.10}$$

where $K_1$ and $\tau_0$ are material constants, and σ is the normal stress acting on the shear plane.

Velocity relations may further be developed geometrically; they are:

$$V_c = \frac{V \sin\phi}{\cos(\phi - \alpha)} \tag{2.11}$$

$$V_s = \frac{V\cos\alpha}{\cos(\phi - \alpha)} \quad (2.12)$$

where V is the cutting velocity, $V_C$ is the chip velocity, and $V_S$ is the shear velocity.

The difference in the geometry of oblique cutting may be first compared to orthogonal cutting, the geometrical planes indicate a plane normal to the cutting edge and parallel to the cutting velocity V defined as the normal plane $P_n$. Shear deformation takes the form of plane strain without side spreading, thus the shearing and chip motion are identical on all the normal planes parallel to the cutting speed V and perpendicular to the cutting edge. Therefore, the cutting velocity (V), shear velocity ($V_s$), and chip velocity ($V_c$), are all perpendicular to the cutting edge. Similar to orthogonal cutting, the resultant cutting F, as well as other forces acting on the shear and chip-rake face contact zone, also lie on the normal plane $P_n$. There are no cutting forces perpendicular to the normal plane, however the cutting velocity has an oblique or inclination angle i in oblique cutting operations, and therefore the directions of the shear, friction, chip flow, and resultant cutting force vectors have components in the three Cartesian coordinates (x,y,z). The geometry of oblique cutting is discussed in Y. Altintas, 2000, "Mechanics of Metal Cutting," in Manufacturing Automation: Metal Cutting Mechanics, Machine Tool Vibrations, and CNC Design, Cambridge, UK. Cambridge University Press, pp. 4-65.

The most important planes in oblique cutting are the shear plane, the rake face, the cut surface xy, and the normal plane $P_n$, or xz. Since most analyses assume that the mechanics of oblique cutting in the normal plane are equivalent to that of orthogonal cutting, all velocity and force vectors are projected on the normal plane. The angle between the shear and the xy planes is called the normal shear angle $\phi_n$.

On the shear plane lies the shear velocity which makes an oblique angle $\phi_i$, with the vector normal to the cutting edge on the normal plane. The shearing chip flow moves along the rake face plane with a chip flow angle n measured from a vector on the rake face but normal to the cutting edge and also lying on the normal plane. The frictional force between the chip and the rake face is collinear with the direction of chip flow. The angle formed between the z-axis and the rake face is defined as the normal rake angle $\alpha_n$. The friction force $F_u$, along the rake face and the normal force to the rake $F_v$, form the resultant cutting force F at a friction angle $\beta_a$. The resultant force $F_v$ projects an acute angle of $\theta_i$ with the normal plane, which in turn has an in-plane angle of $(\theta_n + \alpha_n)$ with the normal force $F_v$. The angle $\theta_n$ is the angle between the x-axis and the projection of F on the normal plane. The following geometric relations can be derived:

$$F_u = F\sin\beta_a \quad (2.13)$$
$$= F\frac{\sin\theta_i}{\sin\eta} \rightarrow \sin\theta_i$$
$$= \sin\beta_a \sin\eta$$

$$F_u = F_v\tan\beta_a \quad (2.14)$$
$$= F_v\frac{\tan(\theta_n + \alpha_n)}{\cos\eta} \rightarrow \tan(\theta_n - \alpha_n)$$
$$= \tan\beta_a \cos\eta$$

The chip velocity $\vec{V}_c$, shear velocity $\vec{V}_s$, and cutting velocity $\vec{V}$, can each be defined by their corresponding Cartesian components:

$$\vec{V} = (V\cos i, V\sin i, 0) \quad (2.15)$$

$$\vec{V}_C = (V_C \cos\eta \sin\alpha_n, V_C \sin\eta, V_C \cos\eta \cos\alpha_n) \quad (2.16)$$

$$\vec{V}_s = (-V_s \cos\phi_i \cos\phi_n, -V_s \sin\phi_i, V_s \cos\phi_i \sin\phi_n) \quad (2.17)$$

Through elimination of V, $V_c$, and $V_s$ from the velocity relations $$\vec{V}_s = \vec{V}_c - \vec{V}$$

the geometric relation between the shear and the chip flow directions can be derived:

$$\tan\eta = \frac{\tan i \cos(\phi_n - \alpha_n) - \cos\alpha_n \tan\phi_i}{\sin\phi_n} \quad (2.18)$$

The relationships generated above are used to define the geometry of the oblique cutting process.

During a machining process, a large stress generation occurs as the tool penetrates the workpiece. Initially, elastic deformation occurs as the stress reaches the yield stress of the work material, then plastic deformation starts and is followed by the formation of a chip. The boundary line between the chip and workpiece, or the line separating the deformed from the undeformed material, is the shear plane. The angle between the shear plane and cutting speed direction is the shear angle. In hard turning, chip segmentation starts when the material in front of the tool is compressed, and the compressive stress initiates a crack on the free surface. As the tool advances, the initiated crack propagates towards the cutting edge, and it stops before reaching the tool tip (as discussed in H. A. Kishaway and M. A. Elbestawi, 1999, "On the Characteristics of Chip Formation in Hard Turning," Proceedings of the 7th International Symposium on Plasticity and its Current Applications (PLASTICITY '99"), pp. 361-364). A saw-toothed chip is a typical feature of hard turning, and this type of chip is defined as a continuous chip with variation in thickness.

Generation of a new surface is one of the main purposes of machining and the quality produced affects the performance of the machined part. The types of chips formed, the tool profile, and the process parameters will determine the surface finish during metal cutting. Continuous and discontinuous chips will generate different surface finishes. Generally speaking, a continuous chip with no built-up-edge (BUE) generated is more desirable as it keeps the cutting force fluctuations minimized and the cutting conditions stable. At a minimum, if these conditions are met, the tool profile will be reproduced on the workpiece surface and this pattern is referred to as 'feed marks'. By standard methods, the surface finish can be specified, and it is called surface roughness, measured in micrometers (μm).

K. Nakayama, M. Arai and T. Kanda, 1988, "Machining Characteristics of Hard Materials," Annals of CIRP—Manufacturing Technology, Vol. 37/1, pp. 89-92, presents a study of the surface quality after hard turning with single a point tool. It was demonstrated that flank wear does not affect the surface finish until the cutting edge becomes rough and deteriorates the surface. P. Chen, 1991, "Characteristics of Self-Propelled Rotary Tools in Machining High Performance Materials," International Journal of Japan Society of Precision Engineering, Vol. 25/4, pp. 267-272, discusses the influence of rake angle, inclination angle, cutting speed, and feed rate on the surface waviness and roughness. M. L. Penalva, M. Arizmendi, F. Diaz and J. Fernandez, 2002, "Effect of Tool Wear on Roughness in Hard Turning," Annals of CIRP, Vol. 51/1, pp. 57-60, discusses that rubbing from flank wear cannot influence the quality of the machined surface much, since the cutting edge shifts due to tool wear, keeping the contact area between the flank and workpiece small.

For most practical machining operations, the same portion of the cutting edge and rake face of the cutting insert are continuously in contact with the moving chip, which generates high tool-chip interface stresses and temperatures, tool wear, and eventually tool failure. However, as a benefit, the moving chip flow transfers a large percentage of the total heat generated during machining away from the tool-chip interface. Without this heat transfer, much higher temperatures and lower tool life are expected, possibly threatening the economical viability of machining operations. Thus, a method to decrease the tool wear rate is to continuously change the portion of the cutting insert in contact with the workpiece during a machining operation.

A tool with infinite cutting edge length would be required to satisfy this criteria. However, a more practical alternative includes the use of a circular shaped cutting insert which has the ability to rotate about its axis such that the engaged cutting edge is continuously fed into the tool chip interface zone. This would generate cyclical exposure of the cutting edge and rake face to the chip formation process. The cyclical behavior allows for a 'rest' period between engagements and such a process is often coined as the 'self-cooling' feature of the tool. Such tools are referred to as 'rotary tools' and the machining process associated with these tools may be called the 'Rotary Tool Cutting Process'.

The geometry of the rotary cutting tool is a frustum of a cone which can be orientated such that the base acts as the rake face (Type I) or with the cutting tool positioned vertically and the cone peripheral surface acting as the rake face (Type II) (as discussed in V. Karri, 1991, "Fundamental Studies of Rotary Tool Cutting Processes," Ph.D. Thesis, University of Melbourne).

The cutting tool, known as an insert, rotates simultaneously with the workpiece in addition to its linear feed motion. The spinning action of the insert supplies the fresh cutting edge to the workpiece being machined. The cooling time for an individual cutting point on the insert is much higher than the cutting time for the same point.

Very fine machined surfaces can be obtained with the rotary tool, provided the tool spindle assembly is adequately rigid, due to the circular profile of the cutting insert. Rotary tools are also classified into two different categories: driven or self-propelled. For the self-propelled rotary tool (SPRT), the insert is rotated by the cutting force and chip flow on the rake face, whereas a driven rotary tool (DRT) is rotated by an independent external power source, such as a motor. It is essential in SPRTs that an inclination angle exists between the insert's spinning axis and the cutting velocity. This ensures that the tool will be propelled in the appropriate direction during the chip formation process. If the case is the opposite and the insert's spinning axis is set parallel to the workpiece cutting velocity, for example, such as the workpiece velocity is perpendicular to the cutting edge and therefore cutting orthogonally, then the tool cannot be propelled by the chip flow.

Reasons why rotary tools are not widely commercially available may be due to the difficulty in ensuring consistent performance in prior art rotary tool, and the inability of prior art rotary tools to accept other insert shapes besides disc-like inserts.

Some studies have focused on the demands of high performance materials in the aerospace and automobile industries, and the challenges in machining such materials, including metal-matrix composites (MMC), titanium, and nickel based (as discussed in P. Chen, 1992, "High Performance Machining of SiC Whisker-reinforced Aluminum Composite by Self-Propelled Rotary Tools," CIRP, STC C, Vol. 41/1, pp. 59-62). Studies have found that in the machining of MMC (SiCw/Al) with self-propelled rotary tools, the carbide tool life can be extended remarkably by using rotary tools (for example, such as approximately 50 times compared to the fixed circular insert cutting and 112 times compared to a square-profiled insert). Moreover, the rotary tool is capable of high-speed cutting and high-feed rate cutting. The improvement of the rotary tool performance was attributed to the even distribution of tool wear along the entire circumference of the insert cutting edge, reduction of the effective cutting speed due to the rotation of the insert, and the decrease of cutting forces.

Other studies include a study discussed in H. A. Kishawy, A. M. Shawky and M. A. Elbestawi, 2001, "Assessment of Self-Propelled Rotary Tools During High Speed Face Milling," $4^{th}$ International Machining & Grinding Conference, MR01-227, Troy, Mich., USA, pp. 1-10, that evaluates the performance of self-propelled rotary tools in high-speed dry face milling of cast iron. The wear resistance of the rotary tool was found to be superior compared to the single point cutting tools. Yet another study discussed in H. A. Kishawy and A. G. Gerber, 2001, "A Model for Tool Temperature During Machining with a Rotary Tool," ASME International Mechanical Engineering Congress and Exposition, New York, N.Y., IMECE2001/MED23312, pp. 1-8, to analyzes the characteristics of heat transfer and temperature during rotary tool machining. It was noted that the optimized driven rotary tool insert rotating speed could minimize the cutting temperature.

Moreover, in V. Dessoly, S. N. Melkote and C. Lescalier, 2004, "Modelling and Verification of Cutting Tool Temperatures in Rotary Tool Turning of Hardened Steel," International Journal of Machine Tools & Manufacture, Vol. 44, pp. 1463-1470, a tool temperature distribution model for self-propelled rotary tool machining of hardened steels is discussed. This model involves the moving heat source theory and generates a finite element model (FEA) to obtain the solution. Good agreement was found with the predicted and experimental results gathered from an infrared camera. Cutting temperatures for rotary tool machining were found to be lower (by approximately 50° C.) compared to that obtained with a conventional non-rotating circular fixed tool under identical cutting conditions.

Yet another study hard focuses on turning using self-propelled rotary tools on heat-treated steel (as discussed in Y. Zhang, J. Wilcox and H. A. Kishawy, 2003, "An Assessment of Carbide Self-Propelled Rotary Tools During Machining of Hardened Steel," NAMRI/SME 31st North American Manufacturing Research Conference, Hamilton, Ontario, Canada, pp. 185-192). This study outlines a new method for the finishing process with no coolant, high material removal rate and superior tool life.

A study discussed in S. Lei and W. Liu, 2002, "High-speed Machining of Titanium Alloys Using the Driven Rotary Tool," International Journal of Machine Tools & Manufacture, Vol. 42, pp. 653-661, develops a new generation of driven rotary tools for high speed machining of titanium (Ti-6Al-4V). The cutting forces were not sensitive to the change of cutting speeds in the range between 240 and 480 m/min when using driven rotary cutting tools. Tool wear leading to short insert life in driven rotary tools during high speed machining is generated by the thermal interactions. This study also mentions that the increased tool life of rotating tools also improves productivity by reducing indexing time.

A further study discussed in E. J. A. Armarego, V. Karri and A. J. R. Smith, 1993, "Computer-aided Predictive Models for Fundamental Rotary Tool Cutting Processes," Annals of the CIRP, Vol. 42/1; E. J. A. Armarego, V. Karri and A. J. R. Smith, 1994, "Fundamental Studies of Driven and Self-Propelled Rotary Tool Cutting Processes—I. Theoretical Investigation," International Journal of Machine Tools & Manufacturing, Vol. 34/6, pp. 785-802; and E. J. A. Armarego and R. K. Katta, 1997, "Predictive Cutting Model for Forces and Power in Self-Propelled Rotary Tool Turning Operations," Annals of the CIRP, Vol. 46/1, came up with predictive models for the fundamental rotary tool cutting process. This study developed an equivalent oblique cutting model for the rotary cutting process, including the consideration of insert rotating velocity.

Another study discussed in L. Li, 2005, "A Force Model for Self-Propelled Rotary Tools," MASc. Thesis, University of New Brunswick, generated a force model for the self-propelled rotary tool cutting process based on the equivalent transformation method, circular shape (nose radius) cutting edge chip flow prediction method and orthogonal cutting force prediction method. This work also presented relative chip flow direction prediction and absolute chip flow direction which resulted in good agreement with experimental results (average error percentage was lower that 10%). It was also concluded that increasing the feed or cutting velocity would result in a lower friction coefficient when the other cutting conditions remained unchanged.

The studies have determined that the primary benefits of rotary cutting tools generally include: (i) several hundred-folds increase in tool life, considerably higher than those for any other tool of the same material; (ii) reduced cutting temperatures; (iii) improved machining of difficult-to-cut materials like titanium and nickel based alloys; (iv) higher material removal rates during machining; and (v) very fine machined surface (provided tool spindle assembly has adequate rigidity).

Prior art rotary tools have also exemplified certain limitations as follows: (i) no matter how precise (or accurate) the rotating parts have been produced, a cutting edge in motion may always generate more errors than a stationary one; (ii) severe chatter may occur due to the large tool radius and poor stiffness of the rotary system; and (iii) stepped workpieces cannot be produced with rotary tools.

Rotary cutting principles differ from conventional cutting theories due to its unique kinematics character. Important considerations in rotary cutting are inclination angle of the cutting edge, chip flow angle and rake angle, cutting speed, chip deformation, and tool wear.

The inclination angle (i) is the most important factor affecting the performance of rotary cutting. Since the circular inserts have an arc-shaped cutting edge, the tangent at different points is at different angles to the tool reference plane (i.e. the edge inclination along the arc varies) (as discussed in V. A. Zemlyanskii and V. Lubking, 1983, "The Machining of High Speed Materials Using Self-Propelled Rotary Cutting Tools," National Defense Industry Press). The circular cutting edge angle also varies with change in inclination angle. The tool nose here refers to the point where the cutting edge is zero.

The orientation of the inclination angle is also expressed differently. Normal/reverse cutting or normal/reverse feed are common expressions used based on the direction of chip flow, tool rotation or feed motion. The tool nose separates the cutting edge into two parts: major cutting edge on the side towards the feed direction, and minor cutting edge on the other side. When the tool nose is the highest point on the major cutting edge, the edge inclination is said to be positive, otherwise it is negative. This definition is in agreement with BSI296: Part 2, 1972 (as discussed in British Standard Instituion, 1972, "Specification for Single Point Cutting Tools, Part 2, Nomenclature," BSI1296: Part 2). An increase in bearing friction decreases the equivalent inclination (i) of a SPRT. This raises the relative workpiece cutting speed ($V_{wr}$) and the relative chip flow velocity ($V_{cr}$) and hence the cutting temperature and energy consumption. These will in turn accelerate tool wear.

The cutting speed refers to the peripheral velocity of the workpiece following the convention in ordinary metal cutting and independent of the rotary motion and tool geometry. The relative workpiece cutting speed is closely related to the tool edge inclination and rotation of the tool and is actually the cutting speed of an equivalent oblique or orthogonal tool; for a driven or self-propelled rotary tool respectively (as discussed in E. J. A. Armarego, V. Karri and A. J. R. Smith, 1994, "Fundamental Studies of Driven and Self-Propelled Rotary Tool Cutting Processes—I. Theoretical Investigation," International Journal of Machine Tools & Manufacturing, Vol. 34/6, pp. 785-802). These velocity relations for self-propelled rotary tools are illustrated below.

For a SPRT with static inclination angle '$i_s$' not equal to zero and the tool is free to rotate, then the initial cutting action will distribute a cutting force along the cutting edge which supplies the propelling motion to the insert. The forces acting along the cutting edge will accelerate the tool insert until equilibrium is reached when no additional side force acts along the tool cutting edge and provides no resistance. This is possible if assuming free rotation and friction and chip transportation requires no additional energy. This particular instance will occur when the resultant relative workpiece velocity $V_{wr}$ is normal to the cutting edge and the angle of inclination i (defined by the angle made with $V_{wr}$ vector and the normal to the cutting edge at undeformed chip width center), is zero.

From the figure above, the velocity relations become:

$$V_{wr}=V_w \cos i_s \qquad (2.19)$$

$$V_T=V_w \sin i_s \qquad (2.20)$$

So to initiate the self-propelling motion of a freely rotating insert, a static inclination angle must exist as it ensures the generation of the force along the cutting edge which accelerates the insert until equilibrium at a tangential velocity $V_r$.

During a machining process, the rotation of a self-propelled tool is generated 'naturally'. This results in low sliding speed, pressure, and temperature at the tool-chip interface. Due to continuous motion of the cutting edge of rotary tools during machining, a long non-working period for any point (p) on the cutting edge makes the practical cutting path of the point to be reduced by k times. The life of the rotary tool is therefore k times as long as that of a conventional round stationary tool, if other factors are not considered.

Increase in the edge inclination angle (i) reduces the relative cutting speed ($V_r$), relative chip flow velocity ($V_{cr}$), power consumption, cutting temperature, the degree of chip formation and the unit cutting forces. These factors result in a decrease in tool wear intensity. The edge inclination angle has a significant effect on the life of rotary (from a tool design standpoint), and only a little effect on the fixed circular inserts. For example, increasing the inclination angle from 15° to 30° gave a 72% increase in tool life at high cutting speed (240 m/min) and a further tilting to 45° increased tool life by 145% due to lower relative cutting speed (as discussed in P. Chen, 1991, "Characteristics of Self-Propelled Rotary Tools in Machining High Performance Materials," International Journal of Japan Society of Precision Engineering, Vol. 25/4, pp. 267-272). The percentage improvement in tool life (Kr) due to variation of edge inclination can be estimated by:

$$Kr = \frac{V}{Vr} \quad (2.21)$$
$$= \frac{1}{\cos i}$$

However, an increase in inclination angle may also cause variation of the effective working angles along the curved cutting edge, an increase in the rotary speed of the self-propelled tool and hence aggravate fatigue problems. The resulting influence of the edge inclination on tool wear comes from these two opposing effects.

The diameter of the insert used has more influences on the rotary tool wear. Foremost, wear of a rotary tool spreads around its circumferential cutting edge. Thus, a larger insert will have a longer cutting edge and thus reduced tool wear. Second, an increase in the radius of the tool will decrease the tool contact angle subtended by the tool-workpiece contact arc, thereby reducing the variation of the working angles along the arc. This slows down the rotational speed, lowers the fluctuation of strain and stress, and reduces the tendency for fatigue wear (as discussed in V. A. Zemlyanskii and V. Lubking, 1983, "The Machining of High Speed Materials Using Self-Propelled Rotary Cutting Tools," National Defense Industry Press). Third, a large insert may induce vibration easily, causing chipping of the cutting edge. Fourth, the rake and clearance angles ground on the insert influence the working angle, the heat capacity of the cutting edge, and the friction between the flank face and the machined surface; all of which affect SPRT tool life.

An increase in bearing friction decreases the equivalent inclination (i) of a SPRT. This raises the relative workpiece cutting speed ($V_{wr}$) and the relative chip flow velocity ($V_{cr}$) and hence the cutting temperature and energy consumption. These effects will accelerate tool wear.

Chip and flank wear are the predominant failure modes when machining with prior art self-propelled rotary tools (as discussed in V. A. Zemlyanskii and V. Lubking, 1983, "The Machining of High Speed Materials Using Self-Propelled Rotary Cutting Tools," National Defense Industry Press; 18). Abrasion wear mechanisms are common with SPRTs during high speed cutting conditions since the softened chip particles tend to stick to the rotating tool surface, which then cycles through the tool-chip interface. Using self-propelled rotary tools also produces stable built-up-edges (BUE) at higher cutting speeds due to decrease in cutting temperatures, which results in a wider cutting range where BUE would normally occur.

Oxidation often occurs on the cutting edge of prior art rotary tools more often than stationary tools because of the shorter cutting time and longer exposure to air the cutting edge experiences. This generates oxide films that can prevent adhesion of work materials to the rotary tool, as well as diffusion wear of the tool (a wear mechanism already reduced by rotating tools because of the lower cutting temperatures). Fatigue wear is more likely in rotary tools (as the tool edge undergoes regular intervals of fluctuating temperatures), especially when machining with carbide inserts. This can be illustrated by thermal cracking of rotary tools along the radial direction of a circular carbide insert with prolonged machining (as discussed in V. A. Zemlyanskii and V. Lubking, 1983, "The Machining of High Speed Materials Using Self-Propelled Rotary Cutting Tools," National Defense Industry Press). The number and length of cracks increase almost linearly with cutting time. At a certain point, networks of cracks are formed, resulting in breakage of grain structures or aggregates of the tool particles and eventual fracture of the cutting edge.

For proper operation, an SPRT must have a minimum value of edge inclination angle (i) in order to provide the necessary driving forces to rotate the insert. Keeping in mind the forces necessary to overcome bearing friction, minimum values of edge inclination angles include 2.50-7.50° (as discussed in W. Y. Chen, 1993, "The Machining of Hardened Steel Using Superhard Tooling CBN and CBN Tipped Rotary Cutting Tool," Ph.D. Thesis, University of Birmingham) and a maximum of about 72° (as discussed in V. A. Zemlyanskii and V. Lubking, 1983, "The Machining of High Speed Materials Using Self-Propelled Rotary Cutting Tools," National Defense Industry Press).

Cutting speed employed in SPRT is determined by the tool material, workpiece material, and the expected tool life. Feed rates tend to be cutting condition and dynamic response dependant. For example, a very low feed rate may excite chatter and deteriorate the machined surface in practice. In this case, improved surface finish can be obtained by increasing the feed rate until the surface profile is characterized by feed lines (as discussed in A. H. Bekkala and C. H. Kahng, 1979, "A Study on the Self-Propelled Rotary Tooling," Manufacturing Engineering Transactions, 7th NAMRC, pp. 255-261; and A. A. Radwan, 1981, "Shear Angle Relationship in Cutting with Self-Propelled Rotary Tool," SME Manufacturing Engineering Transactions, 9th NAMRC, pp. 437). Since rotary tool inserts are circular, the tool-workpiece contact is long and results in larger cutting forces and chatter when compared to conventional profiled inserts (i.e. square, rhomboid, etc.). The depth of cut has a large influence on the length of the contact arc. The power consumption and rigidity of the entire machining system are the primary factors when determining depth of cut.

Cutting temperature, has a significant effect on finish quality and on tool life when machining with SPRT. Cutting speed and inclination angle of the insert affect the cutting temperature. When the inclination angle is increased, cutting temperature decreases due to the reduced amount of work required for workpiece material deformation and friction on the rake face of the tool. An improvement in heat transfer from the cutting zone is also achieved due to the increase in insert rotational speed. Increase in workpiece cutting speed leads to increased cutting temperatures, similar to conventional machining, and an increase in depth of cut and feed rate have the same effect. Self-propelled rotary tools tend to generate cutting temperatures on the range of 50-150° C. lower than fixed circular tools (as discussed in A. H. Bekkala and C. H. Kahng, 1979, "A Study on the Self-Propelled Rotary Tooling," Manufacturing Engineering Transactions, 7th NAMRC, pp. 255-261).

Increasing feed generates a better surface quality when using a SPRT. Better surface finish occurs at inclination angles lower than 10° (as discussed in A. H. Bekkala and C. H. Kahng, 1979, "A Study on the Self-Propelled Rotary Tooling," Manufacturing Engineering Transactions, 7th NAMRC, pp. 255-261). Cutting speed has negligible effect on the surface finish generated in rotary tool machining. Compressive residual stresses and thus higher surface strength and fatigue life are normally generated with rotary tool machining unlike conventional machining which produces tensile residual stresses. The magnitude of the compressive residual stress increases with an increase in inclination and bearing friction. Thermal damage on the machined surface is also reduced given the lower cutting temperatures of rotary tool machining.

Fundamental factors must be considered during the design of a self-propelled rotary tool and such factors have been involved in the design and configuration of the present invention: (i) tool structure, including fixture and base of insert, must be simplistic; (ii) tool structure should be durable, accurate and easy to maintain; and (iii) the tool structure should be easily assembled and coupled to a standard lathe tool post or turret.

Design and Configuration of the Present Invention

The design and configuration of the present invention reflect that tool geometry should allow the largest possible depths of cut, feed rate, stable cutting, superior surface finish, low relative cutting speed ($V_r$) and low cutting temperature. Very large nose radius inserts, excessive running clearance of the bearing and eccentricity of the circular cutting edge could cause chatter during machining. For example, a much smaller radius insert, high inclination angle, and reduced eccentricity of the insert may be included in the tool geometry.

The present invention is self-propelled rotary tool for hard turning, capable of accepting inserts, for example, such as inserts with ISO designation RCMT 09 T3 00. A primary aspect of the design of the present invention is the bearing system. The bearing system is designed and configured such that it is operable to withstand high running speeds and high radial and thrust loads with relatively low friction and minimum eccentricity under dynamic conditions. A structure with two needle roller thrust bearings and one radial needle roller bearing is incorporated in embodiments of the present invention to achieve a lower coefficient of friction and reduced cost.

EXAMPLE

Dry hard turning tests were conducted to examine the performance of an embodiment of the self-propelled rotary tool of the present invention. The present invention tool is configured such that the insert's cutting edge is positioned with a fixed inclination angle i=25° and a normal rake angle $\alpha_n$=−5°.

As shown in FIG. 8, a tool 32 is configured to receive an incorporate an insert 34. The inserts used in the test were uncoated carbide and had a diameter of 9.5 mm and clearance angle of 7°. A skilled reader will recognize that other inserts can be used in embodiments of the present invention. The inserts utilized in the test are readily available and manufactured by many machining companies in different grades and/or with different coatings. For fixed cutting conditions, the thrust bearings were removed from the tool holder assembly, replaced with washers, and clamped securely to deny insert rotation.

The materials used in this experiment were AISI 4140 steel and Grade 5 Titanium (Ti-6Al-4V). The 4140 steel was heat-treated to obtain a 'hard-to-cut' material status (i.e. 54-56 HRC). The compositions of the steel and titanium samples are as follows.

| Composition of AISI 4140 Steel | |
|---|---|
| Component | Content % |
| C | 0.38-0.43 |
| Mn | 0.75-1.00 |
| P | 0.035 Max |

-continued

| Composition of AISI 4140 Steel | |
|---|---|
| Component | Content % |
| S | 0.04 Max |
| Si | 0.15-0.30 |
| Cr | 0.80-1.10 |
| Mo | 0.15-0.25 |

| Composition of Titanium (Grade 5, Ti—6Al—4V). | |
|---|---|
| Component | Content % |
| Al | 5.5-6.75 |
| Fe | 0.25 Max |
| O | 0.20 Max |
| Ti | Balance |
| V | 3.5-4.5 |

The materials used had standard stock size diameters of 25.4 mm, and were cut to lengths of 304.8 mm.

During each cutting pass, the insert rotation speed was measured and recorded using a laser tachometer (E655Digital™, +/−0.05% accuracy). The bottom side of the rotating insert holder was used as a reference for measurement, which required special placement of a small reflective strip and colouring the remainder of the surfaces black. This allowed for the tachometer to read the reflection of an emitted laser beam off the reflective strip and thus measure tool/insert speed (RPM). After each pass, the surface roughness was measured using a surface roughness tester (Mitutoyo™ SJ-201), and samples of chips were collected for observation. Following each pass (SPRT tests), the tool flank wear was also measured at several locations about the circumference. The measurements were obtained through the use of a tool maker's microscope (Mitutoyo™) and were averaged and recorded. Similarly, for fixed tool cutting, flank wear was measured at the arc segment used in cutting and the maximum value was recorded.

As shown in FIG. 9, in the test, a digital camera 36 was used to record video clips during the cutting process. The camera was fixed to view the tool chip zone, workpiece 38, and feed motion of the tool. The work piece was held in a rotatable chuck 40, the SPRT 42 of the present invention was extended from a turret tool holder 44, having a feed motion as indicated by 46. A tachometer 48 and magnetic support 50 were utilized to gather test results. A live center tailstock 52 was positioned virtually parallel to the workpiece. In the test a Leadwell® T-6 turret-type CNC lathe was used for the cutting tests. A view of the configuration machine and tool set-up 54 of the test of the present invention is shown in FIG. 10.

In the tests of the an embodiment of the present invention, each workpiece was machined with different cutting speeds; 4140 steel was machined using a cutting speed of 280 m/min, and titanium was machined using a cutting speed of 200 m/min. Depths of cut for steel and titanium were 0.3 mm and 0.2 mm respectively. The feeds for both materials were 0.150 mm/rev, 0.225 mm/rev, and 0.300 mm/rev. The machining was dry cutting; no coolant was used.

The results of the test identified aspects of the present invention relating to: insert rotation speeds, surface roughness, chip formation, and flank wear. The insert rotational speeds account for the relative relations in the rotary cutting process.

For both material workpieces, all conditions for cutting were executed and successfully completed. The present invention tool was found to achieve tool life benefits that are the basis for lengthened tool life. For example, given a limitation in material supply, an embodiment of the present invention tool may be operable to prolong insert tool life by a minimum of 55 times to that of the fixed tool when cutting AISI 4140 Steel, and a minimum tool life improvement of 4 times to that of fixed tool when cutting Grade 5 Titanium. It should be noted here that the carbide inserts used were employed for all tests, and are not designed for machining of Titanium materials; proving another benefit of the present invention.

Flank wear VB, can be used to gauge tool life, so that generally, if the flank is evenly worn, tool wear of 0.3 mm is the maximum allowance. Beyond this point, the tool cannot be used for finishing operations. In addition, if a failure occurs, the tool is no longer capable of cutting. Such criteria were adhered to in the tests conducted utilizing an embodiment of the present invention. AISI cutting distance table 56, as shown in FIG. 11, depicts the progression of tool wear during the machining of AISI 4140 (wherein, $V_w$,=280 m/min, d=0.3 mm, 9.5 mm carbide insert). Titanium cutting distance table 58, as shown in FIG. 12, depicts the progression of tool wear during the machining of Grade 5 Titanium (wherein, $V_w$,=200 m/min, d=0.2 mm, 9.5 mm carbide insert).

In the test of an embodiment of the present invention the carbide inserts showed different wear characteristics in their fixed and rotating cutting conditions. Brand new, the inserts appeared shiny on both their flank and rake faces. For fixed inserts, the machining tests of AISI 4140 steel produced failure of the insert's cutting edge. Preceding tool failure, the dominant wear mechanism was developed on the rake face and right before failure, crater wear was clearly visible. For self-propelled rotary tool cutting, the carbide inserts carried uniform wear on both the flank and rake face during cutting of AISI 4140 steel. Under high feed rate (0.3 mm/rev), local failures were developed on the cutting edge (chipping), but were not significant enough to jeopardize tool life or machining quality and performance.

For fixed inserts during machining of Grade 5 titanium, aggressive and rapid flank wear was observed. The grade of carbide inserts used were not designed for the machining of titanium materials and thus the observations reported here should not represent common wear characteristics for the fixed cutting tool conditions. However, these tests can be used to simulate machining under more aggressive conditions (for example, such as increased material removal rate) and can predict performance of the SPRT over the fixed tool in the machining of titanium with appropriate cutting inserts. Flank wear exceeding 0.3 mm was the reference for tool life during the fixed cutting tests as there were no failures before reaching this state. This could be the result of protection provided on the rake face from material deposits (further leading to a BUE), and the majority of material removal from the tool was along the flank wear land over the cutting distance.

During the self-propelled rotary tool cutting tests of the present invention, material deposit was also observed along the circumferential rake face, but was considerably less than that developed on the fixed insert. Little to no crater wear was observed which can be attributed to the material deposits and significant reduction in heat generation along the cutting edge. Under the higher feed rate (0.3 mm/rev), several local failures were observed on the insert (notching) during the intermediate stages of cutting until failure at a particular site on the cutting edge was observed.

This may be the cause of the cyclical thermal shocking during machining with the rotating cutting edge. The carbide insert's mechanical properties were likely distorted due to the rapid increase and decrease in temperature along the cutting edge until they finally yielded and fracture occurred at a particular site. Given the observations of tool wear in the machining of Grade 5 titanium were similar for both fixed and rotating conditions, the improvement in tool life by the SPRT can be largely attributed to the longer effective cutting edge provided by the tool rotation. Therefore, the improvement of tool life is expected to be proportional to the ratio between the circumference of the tool to the instantaneous contact arc length between the tool and the workpiece.

For all cutting tests it was observed that lowering the feed rate prolongs tool life. This largely contributed to the decrease in cutting forces and relative velocities. As shown in FIG. 13, the progression of flank wear may affect the tool speed of the present invention. During the initial break-in period of the tool, as shown in FIG. 13, and including time from virgin cutting edge to development of flank wear, the tool average rotational speed decreases slightly from the first contact pass before it increases again and finds a steady rotational speed range. FIG. 13 generally shows flank wear progression and effect on tool speed during machining of AISI 4140 Steel. Different feeds are shown in tables (a)-(c) of FIG. 13 that are $V_w$=280 m/min, d=0.3 mm, feeds. Feed at 0.3 mm/rev table 60 is shown in FIG. 13a, feed at 0.225 mm/rev table 62 is shown in FIG. 13b, and feed at 0.15 mm/rev table 64 is shown in FIG. 13c. Possible reasons for the general flank wear progression and effect on tool speed during machining for various feeds could include the following mechanical scenarios.

Initial higher rotational speeds are the result from higher frictional forces generated by deglazing of surface impurities leftover from the edge honing process. The decrease in tool rotational speed is directly related to a decrease in the coefficient of friction as a result of oxidation layers forming on the virgin cutting edge. Once the conditions for generation of oxidation layers diminish, the frictional forces increase due to higher wear of the carbide substrate surface and thus increase tool rotational speed. Once the break-in period of the insert has been achieved, a steady range of tool speed will occur. It should be noted here that in addition to the cutting conditions, the tribology of the SPRT assembly will also affect the rotational speed of the tool. Therefore, it is assumed there is a small loss in rotational tool speed as a result of friction in the bearings.

As shown in FIG. 14 generally, tool rotational speed during the machining of titanium remained relatively constant over the entire cutting distance. FIG. 14 shows flank wear progression and effect on tool speed during machining of Grade 5 Titanium for various feeds ($V_W$=200 m/min, d=0.2 mm, feeds), including 0.3 mm/rev feed table 66, 0.225 mm/rev table 68, and 0.15 mm/rev table 70. A 9.5 mm carbide insert is utilized in these feeds generally.

The steady state rotational speed range is encountered immediately given there is no speed fluctuation during a break-in period at the initial stages of cutting as seen with the AISI 4140 steel machining tests. In fact, as shown by the flank wear progressions, tool wear occurs rapidly (as is more noticeable at the higher feed rates), as a result of titanium's 'difficult-to-cut material' properties. Although a break-in period will have occurred, it happened too rapid to observe during data collection. There is however a similar tool break-in and rotational speed relation during the machining test with feed rate of 0.150 mm/rev (as shown in FIG. 14c), before the tool wear reaches a state where a steady speed range is observed.

As shown in FIG. 15, in rotation tool speed table 72, an increase in feed rate produces an increase in average SPRT rotational speed for both materials tested in the tests of an embodiment of the present invention. These test results reflect SPRT rotational tool speed during machining of different materials at different feed rates (of AISI 4140 Steel: $V_w$=280 m/min, d=0.3 mm; Titanium (Grade 5): $V_{w,}$=200 m/min, d=0.2 mm, 9.5 mm carbide insert). Given the tool cutting edge inclination angle was fixed and the cutting speeds and depths of cut were held constant for each material, the remaining cutting condition of feed rate shows a direct relation to tool speed. It should be noted here that the tool speeds plotted are the averages over the entire cutting distances. Although cutting conditions were relatively close for both materials, the differences in tool speeds can also be accounted for by the differences in abrasion wear, material deposition, and frictional losses.

Surface quality is an important factor that affects the performance of the mechanical component. The quality of the produced surface is strongly affected by the tool wear and the force generated. An assessment of the surface quality produced by the present invention SPRT with carbide insert was undertaken during the tests.

Surface finish can be specified in a couple of ways; the peak-to-valley height and the center-line-average value. The peak-to-valley height is the root-to-crest value of roughness. The center-line-average value is based on a mathematical concept and is found by averaging the heights of the surface above and below a center line. The center line is a line parallel to the general direction of the profile such that the areas of the profile above and below the center line are equal. The values of surface roughness obtained in this investigation are all center-line-average values (Ra).

As shown in FIG. 16, the surface roughness values table 76 depicts surface roughness measured on the hard turned surface produced by both the fixed tool configuration and self-propelled rotary tool with different feed rates, and specifically surface roughness measurements during machining of AISI 4140 Steel at different feed rates ($V_W$=280 m/min, d=0.3 mm, 9.5 mm carbide insert). As shown, the fixed inserts have a smaller overall range in surface roughness values when compared to the range produced with the SPRT. However, at feed rates of 0.15 mm/rev and 0.225 mm/rev, the SPRT produces minimal difference in surface roughness values when compared to the fixed tool. Moreover, the SPRT of the present invention produced cuts with roughness values within reasonable limits. The larger difference observed between the SPRT and fixed tool at a feed rate of 0.3 mm/rev, can be the result of several possible factors. Machine stability without a doubt plays a significant roll. The relative cutting velocity vector also affects the performance, which as shown in FIG. 15, is the result of the increased tool speed with feed. The moving parts and tribology of the SPRT assembly could also affect the acoustics of the cutting operation.

Similar results were also found during the machining of Grade 5 titanium as shown in FIG. 17, that depicts surface roughness measurements table 76 showing surface roughness measurements during machining of Grade 5 Titanium at different feed rates ($V_W$=200 m/min, d=0.2 mm, 9.5 mm carbide insert). However, a much larger difference in surface roughness is observed at a feed rate of 0.3 mm/rev, which could be greatly influenced by the increased smearing action observed between the tool and workpiece. In addition, material sticking/welding on the workpiece was also much more substantial at this feed rate.

Another observation made was the surface markings left on the machined surfaces of the SPRT hard turned materials. FIG. 18 shows trace lines generated on the surface of a SPRT hard turned Grade 5 Titanium workpiece sample ($V_W$=200 m/min, d=0.2 mm, f=0.225 mm/rev, 9.5 mm carbide insert). As shown in FIG. 18, there is a cutting trace line indicated on the surface of machined titanium workpiece, and cutting direction 78 is compared to relative motion 80. The line is approximately measured to illustrate the direction of the markings. Clearly, contrary to the machined surfaces generated under conventional turning and those generated by the fixed tool, the cutting trace lines typically coincide with the cutting direction 78. The trace line angles produced by the SPRT of the present invention, as shown in FIG. 18, are smaller than the inclination angle of the tool (i=25°) due to the existence of friction in the bearing assembly and the influence of relative cutting velocity.

FIGS. 19a and 19b show the formation of chips during the machining of AISI 4140 steel with both the SPRT of the present invention and fixed tool are shown for different feed rates Specifically, typical chips obtained under different feeds during cutting of AISI 4140 Steel with SPRT and Fixed tool ($V_{w,}$=280 m/min, d=0.3 mm, 9.5 mm carbide insert) are shown in FIGS. 19a and 19b.

FIGS. 20a and 20b show the formation of chips during the machining of Grade 5 titanium with both the SPRT of the present invention and fixed tool are shown for different feed rates. Specifically, FIGS. 20a and 20b show typical chips obtained under different feeds during cutting of Grade 5 Titanium with SPRT and Fixed tool ($V_{w,}$=200 m/min, d=0.2 mm, 9.5 mm carbide insert).

In FIG. 19a, the curl radius of the spiral chips formed with the SPRT of the present invention 82, 84, 86 remained consistent and the smallest pitch was at the highest feed rate. All chips were segmented and discontinuous and the higher feed rate chips were approximately double the length of the lower feed rate chips. When comparing to the chips formed by the fixed tool during machining of steel, where the only difference in tools was the ability to rotate, it can be clearly seen how the rotational speed of the tool allows for helical chip formation. A comparison of the chips shows the differences between a chip formed at f=0.150 mm/rev 82, a chip formed at f=0.225 mm/rev 84, and a chip formed at f=0.300 mm/rev 86. Chip 86 having the tightest helical formation.

FIG. 19b further shows a comparison of the chips formed at f=0.150 mm/rev 88, at f=0.225 mm/rev 90, and at f=0.300 mm/rev 92. Chip 92 having the tightest helical formation. All chips formed by the fixed tool during machining of steel were continuous, which generates a safety hazard for the machinist and a source for surface damage during machining. The colour of the chips from the fixed tool tests (deep blue), are also an indicator of the much higher cutting temperatures generated compared to those from the SPRT tests (chips have no blue colouration).

Similarly for hard turning tests of Grade 5 titanium, the SPRT of the present invention produced discontinuous segmented helical chips at all feed rates with almost equal curl radii and pitch dimensions, as shown in FIG. 20a. A comparison of the chips shows the differences between a chip formed at f=0.150 mm/rev 94, a chip formed at f=0.225 mm/rev 96, and a chip formed at f=0.300 mm/rev 98. Chip 98 having the tightest helical formation.

With the tool fixed, as shown in FIG. 20b, helical chips were formed with the increase in feed rates, and at 0.3 mm/rev the chip 105 formed is nearly identical to those produced by the SPRT at the feed rate of 0.3 mm/rev 98 shown in FIG. 20a. Chips formed by the fixed tool for Grad A Titanium at feed rates of f=0.150 mm/rev 100, and at f=0.225 mm/rev 102 are also shown in FIG. 20b. Also, the only discontinuous chip formed for fixed cutting tests was at the highest feed rate. It should be noted the continuous chips were cut for photo purposes.

A particular advantage of the present invention that is highlighted by the results of the tests of the embodiment of the present invention is that the benefits of the SPRT obtained during machining make it economical. Another advantage is that the design of the present invention tool also provides additional economical gains through maintenance, assembly, flexibility, and operation, especially when compared to the prior art SPRTs for hard turning.

It will be appreciated by those skilled in the art that other variations of the embodiments described herein may also be practiced without departing from the scope of the invention. Other modifications are therefore possible. For example, embodiments of the present invention may be incorporate the following elements: (i) surface quality by self-propelled rotary tools, in particular reducing machine vibrations possibly caused by acoustics of the rotating assemblies; (ii) operability for other machining processes; and (iii) tool design that offer further economical benefits throughout the entire machining industry.

The invention claimed is:

1. A rotary head tool is a self-propelled rotary tool SPRT operable for machining that is round cutting involving hard turning, said rotary head tool characterized in that it comprises:
   (a) a tool fixture having a hole therein;
   (b) a tool support incorporating an upper portion and a lower portion, said tool support being insertable within the hole in the tool fixture so that the upper portion of the tool support extends above the tool fixture and the lower portion of the tool support extends below the tool fixture when the tool support is inserted within the hole in the tool fixture;
   (c) a bearing having a hole therein of a size to receive the lower portion of the tool support that extends below the tool fixture, said bearing being held in place encompassing the lower portion of the tool support by one or more washers and a threaded nut engageable with threading formed in the lower portion of the tool support;
   (d) a first bearing having a hole therein of a size to encompass the tool support, said first bearing being insertable within the hole in the tool fixture while encompassing the tool support;
   (e) a second bearing having a hole therein of a size to encompass the tool support, said second bearing having a wider diameter than the hole in the tool fixture, and said second bearing being positionable between the first bearing and the upper portion of the tool support; and
   (f) an insert incorporating a cutting edge being insertable within an indentation formed in a top edge of the upper portion of the tool support, said indentation having a threaded section cut therein to extend below the insert when said insert is inserted within the indentation, said insert having a hole with a threaded inner wall cut therein and being attached to the tool support by a threaded screw fitted within the hole in the insert and connected to the threaded section of the indentation; and
wherein the insert fitted within the indentation is positioned at an angle in relation to the tool fixture, said angle being pre-determined to achieve optimum cutting performance.

2. The rotary head tool of claim 1, further characterized in that the bearing is a needle roller thrust bearing that allows free rotation of the support tool.

3. The rotary head tool of claim 1, further characterized in that the one or more washers are any of the following: a thrust washer; and a M8 washer.

4. The rotary head tool of claim 1, further characterized in that the first bearing is a needle roller bearing that absorbs the radial forces applied to the cutting insert and maintains concentric rotation.

5. The rotary head tool of claim 1, further characterized in that the second bearing is a needle roller thrust bearing that provides support in the axial direction.

6. The rotary head tool of claim 1, further characterized in that the insert is a 9.5 mm insert available off-the-shelf and the screw is a M35×10 T15 Torx screw.

* * * * *